US007959812B2

(12) United States Patent
Theoleyre et al.

(10) Patent No.: US 7,959,812 B2
(45) Date of Patent: Jun. 14, 2011

(54) MULTI-COLUMN SEQUENCED SEPARATION PROCESS FOR SEPARATING AN IONIC METAL DERIVATIVE

(75) Inventors: Marc-André Theoleyre, Paris (FR); Francis Gula, Leyrieu (FR)

(73) Assignee: Applexion, Saint Maurice de Beynost (FR)

( * ) Notice: Subject to any disclaimer, the term of this patent is extended or adjusted under 35 U.S.C. 154(b) by 0 days.

(21) Appl. No.: 12/808,906

(22) PCT Filed: Dec. 19, 2008

(86) PCT No.: PCT/FR2008/001797
§ 371 (c)(1),
(2), (4) Date: Sep. 2, 2010

(87) PCT Pub. No.: WO2009/106734
PCT Pub. Date: Sep. 3, 2009

(65) Prior Publication Data
US 2010/0326918 A1    Dec. 30, 2010

(30) Foreign Application Priority Data

Dec. 20, 2007  (FR) ..................................... 07 08966

(51) Int. Cl.
*B01D 15/08*    (2006.01)
(52) U.S. Cl. ..................... 210/659; 210/656; 210/198.2; 423/6; 423/24; 423/100; 423/138
(58) Field of Classification Search .................. 210/635, 210/656, 659, 672, 198.2; 423/6, 24, 100, 423/138
See application file for complete search history.

(56) References Cited

U.S. PATENT DOCUMENTS

| | | | |
|---|---|---|---|
| 2,815,332 A | 12/1957 | Grosser | |
| 2,985,589 A | 5/1961 | Broughton et al. | |
| 5,093,004 A | 3/1992 | Hotier et al. | |
| 5,554,227 A | 9/1996 | Kwok et al. | |
| 5,618,502 A | 4/1997 | Byers et al. | |
| 5,865,899 A | 2/1999 | Theoleyre et al. | |
| 5,902,409 A | 5/1999 | Kwok et al. | |
| 6,375,851 B1 | 4/2002 | Sterling et al. | |
| 6,379,554 B1 | 4/2002 | Kearney et al. | |
| 6,485,574 B1 | 11/2002 | Chou et al. | |

(Continued)

FOREIGN PATENT DOCUMENTS

EP          0 415 821          3/1991

(Continued)

OTHER PUBLICATIONS

English Translation of the International Preliminary Report on Patentability, IB, Geneva, established Jul. 27, 2010, incorporating the English Translation of the Written Opinion of the ISA.

*Primary Examiner* — Ernest G Therkorn
(74) *Attorney, Agent, or Firm* — Harness, Dickey & Pierce, P.L.C.

(57) ABSTRACT

The subject of the present disclosure is a multi-column sequenced separation process and a drive for implementing this process. The disclosure applies particularly to the separation of metal derivatives such as uranium, nickel, copper, cobalt and other precious metals present in leaching effluents in hydrometallurgical processes.

15 Claims, 16 Drawing Sheets

U.S. PATENT DOCUMENTS

| | | |
|---|---|---|
| 7,067,013 B2 | 6/2006 | Theoleyre et al. |
| 7,067,014 B2 | 6/2006 | Theoleyre |
| 7,388,561 B2 | 6/2008 | Yamano et al. |
| 2003/0230302 A1 | 12/2003 | Theoleyre et al. |
| 2005/0056273 A1 | 3/2005 | Costesso et al. |
| 2006/0003052 A1 | 1/2006 | Theoleyre |
| 2006/0278217 A1 | 12/2006 | Theoleyre |
| 2008/0289448 A1* | 11/2008 | Costa et al. .................. 75/406 |
| 2009/0056500 A1* | 3/2009 | Mendes .......................... 75/743 |
| 2009/0056501 A1* | 3/2009 | Mendes .......................... 75/743 |
| 2009/0056502 A1* | 3/2009 | Mendes et al. ................. 75/743 |
| 2009/0209736 A1* | 8/2009 | Theoleyre et al. ............ 530/413 |
| 2010/0038313 A1 | 2/2010 | Baudouin |
| 2010/0196190 A1* | 8/2010 | Mendes ........................ 420/435 |

FOREIGN PATENT DOCUMENTS

| | | |
|---|---|---|
| FR | 2 848 877 | 6/2004 |
| WO | WO 2007/087698 | 8/2007 |
| WO | WO 2007/144476 | 12/2007 |

* cited by examiner

SEQUENCE 1

SEQUENCED SUBSEQUENCE 1.1

SEQUENCED SUBSEQUENCE 1.2

SEQUENCE 2

SUBSEQUENCE 2.1

SUBSEQUENCE 2.2

SEQUENCE 1

SEQUENCED SUBSEQUENCE 1.1

SEQUENCED SUBSEQUENCE 1.2

SEQUENCE 2

SUBSEQUENCE 2.1

SUBSEQUENCE 2.2

SEQUENCE 1

SEQUENCED SUBSEQUENCE 1.1

SEQUENCED SUBSEQUENCE 1.2

SUBSEQUENCE 1.3

SEQUENCE 2

SUBSEQUENCE 2.1

SUBSEQUENCE 2.2

SUBSEQUENCE 2.3

SEQUENCE 1 step1-1    step time ( h)    3,43 step1-2    step time ( h)    0,50 step1-3    step time ( h)    0,21

Total time h)
    4,14

US 7,959,812 B2

MULTI-COLUMN SEQUENCED SEPARATION PROCESS FOR SEPARATING AN IONIC METAL DERIVATIVE

CROSS-REFERENCE TO RELATED APPLICATIONS

This application is a National Phase Entry of International Application No. PCT/FR2008/001797, filed on Dec. 19, 2008, which claims priority to French Application 07 08 966, filed on Dec. 20, 2007, both of which are incorporated by reference herein.

FIELD OF THE INVENTION

The present invention concerns a multi-column sequenced separation process and a device for implementing said process. The invention applies in particular to the separation of metal derivatives such as uranium, nickel, copper, cobalt and other precious metals present in leaching effluents in hydrometallurgical processes.

BACKGROUND OF THE INVENTION

Several techniques for extracting metal species are commonly used in the metals industry. In particular, in the case where the extracted ores have a low metal derivative content, leaching techniques are used consisting of extracting the soluble metal portions by leaching using a suitable solubilizing agent. Once the metal derivatives are dissolved in ionic form, a subsequent step consists of separating the species of interest from the impurities or other pollutants.

The separation processes are characterized by putting one or several liquid phases (called "mobile") in contact with a solid phase (called "stationary"). The ionic metal derivative injected into the liquid phase establishes one or several interactions of various natures with the stationary phase as is the case in ion exchange chromatography. Its displacement within the chromatographic device is therefore different from the displacement of other products contained in the load to be processed. Based on this difference in interactions, it is possible to purify or enrich one of the fractions with the ionic metal derivative.

Processes have been proposed to carry out the continuous ion exchange. U.S. Pat. No. 2,815,332 describes a closed-circuit system in which the resin progresses in the reverse direction of flow from the liquid. This loop contains four zones isolated by valves and dedicated to saturation, rinsing, regeneration and rinsing, respectively. The resin progresses in the zones and from one compartment to the next, in the reverse direction of flow from the liquid phase, under the effect of hydraulic pulsations.

Certain authors have developed, for chromatography, a system called SMB (Simulated Moving Bed). Thus, U.S. Pat. No. 2,985,589 describes a continuous chromatography process, SMB, in which the chromatography resin is fixed, distributed in several compartments, but its movement is simulated by the movement at regular intervals of the position of the fluid inlets and outlets. The inlet positions (feed and eluent) and outlet positions (extract and raffinate) then define four zones. U.S. Pat. No. 6,375,851 describes a system with six zones, adaptation of the ion exchange of the process previously described in U.S. Pat. No. 2,985,589. The system described in U.S. Pat. No. 6,375,851 is based on a SMB, except for the regeneration step, which is implemented with a front movement. The fluid inlets and outlets are therefore offset, generally simultaneously, synchronously after a sequence. In all of these systems, the authors provide for completely continuity of circulation of all of the fluids. These systems lead to a very significant number of columns, the size of the columns being defined by the smallest sequence of the sequential.

For processes applied in hydrometallurgy, and in particular ion exchange processes as is the case in WO 2007/087698, the production and regeneration steps are systematically followed by rinsing steps. In batch processes, the steps are most often done at the optimal rate relative to the fixing or desorption kinetics. Thus current techniques do not make it possible to perform a large-scale separation process that is economically advantageous, because it requires excessively high quantities of resin for the columns and processing products. This drawback is even more true given that no process currently used makes it possible to perform the entire processing cycle continuously, in particular at the regeneration step of the resins. Added to this drawback is the fact that all of these methods involve the use of very significant quantities of water, in mining regions that are generally located in desert areas, as well as significant quantities of regenerant, which are in most cases highly acidic. In addition to the economic problems, then, one is also faced with ecological problems and the protection of environmental resources.

SUMMARY

The present invention concerns an industrial-scale process that optimizes the quantities of regenerant, resin and water involved in the separation cycles of the ionic metal derivatives present in leaching solutions, and which thus makes it possible to offer better processing capacities to mining development facilities. The process according to the invention respects the environment, makes it possible to obtain a high yield of metal derivatives of interest and is economically much more advantageous that the processes of the prior art. This is done in particular through a separation process on resin through multicolumn sequential selective retention to separate an ionic metal derivative from a leaching solution containing an ionic metal derivative, through passage of that solution on a fixed bed of selective resin of the considered material and comprising at least three zones, flow means for liquid being arranged between adjacent zones and between the last and first zones, this process comprising several sequences, each sequence comprising at least one step chosen from an adsorption step, a rinsing step, a desorption step, which may or may not be done simultaneously, each following sequence is done by moving the fronts in the zones downstream substantially by a same increment before the periodic movement of the introduction and withdrawal points. This process can comprise a subsequence without injection of the load.

According to another aspect of the invention, the process is characterized in that it comprises several sequences, each sequence comprising at least one of the following steps:
(a) introducing a certain volume of a rinsing solution at the inlet of the first zone and substantially simultaneously withdrawing the same volume of a diluted liquid in said ionic metal derivative, at a point situated downstream from said zone;
(b) introducing a certain volume of said load leaching solution at the inlet of the second zone and substantially simultaneously withdrawing the same volume of a liquid rich in the relatively less retained impurity(ies), at a point situated downstream from said zone;
(c) introducing a certain volume of a rinsing solution at the inlet of the third zone and substantially simultaneously withdrawing the same volume of a liquid diluted in regenerant, at a point situated downstream from said zone;

(d) optionally introducing a certain volume of depolluting agent at the inlet of the fourth zone and substantially simultaneously withdrawing the same volume of a diluted liquid, at a point situated downstream from said zone, (e) introducing a certain volume of an eluent at the inlet of the fifth zone and substantially simultaneously withdrawing the same volume of a liquid rich in said metal derivative, at a point situated downstream from said zone;

steps (a), (b), (c), (d) and (e) being able to be done simultaneously or not;

each subsequent sequence being done through the periodic downstream movement, by substantially a same volume increment, of the introduction and withdrawal points, and also including a step (f) displacement of the fronts in at least zones (b) and (e) before the periodic displacement.

According to another embodiment of the invention, the process is characterized in that it comprises several sequences, each sequence comprising the following steps:

(a) introducing a certain volume of an equilibration liquid at the inlet of the first zone and substantially simultaneously withdrawing the same volume of a liquid made up first of regeneration solution then of equilibration solution, at a point situated downstream from said zone;

(b) introducing a certain volume of the load leaching solution to be processed containing the ionic metal derivative at the inlet of the second zone and substantially simultaneously withdrawing the same volume of a liquid containing the relatively less retained impurities, at a point situated downstream from said zone;

(c) introducing a certain volume of a rinsing solution at the inlet of the third zone and substantially simultaneously withdrawing the same volume of a liquid diluted with the impurity or impurity(ies) retained relatively less than the ionic metal derivative, at a point situated downstream from said zone;

(d) introducing a certain volume of elution solution at the inlet of the fourth zone and substantially simultaneously withdrawing the same volume of a liquid, containing the ionic metal derivative, at a point situated downstream from said zone;

(e) introducing a certain volume of a regeneration solution at the inlet of the fifth zone and substantially simultaneously withdrawing the same volume of a liquid containing the most retained impurities, at a point situated downstream from said zone, steps (a), (b), (c), (d) and (e) being able to be done simultaneously or not;

each subsequent sequence being done through the periodic downstream movement, by substantially a same volume increment, of the introduction and withdrawal points, and also including a step (f) displacement of the fronts in at least zone (c) before the periodic displacement.

According to another embodiment of the invention, the process is characterized in that steps (d) and (e) are done with a same fluid, these steps then corresponding to a step consisting of:

(d) introducing a certain volume of regenerant at the inlet of the fourth zone and substantially simultaneously withdrawing the same volume of a liquid rich in said ionic metal derivative, at a point situated downstream from said zone;

the fourth and fifth zones then being combined into a single fourth zone. According to another embodiment of the invention, the process is characterized in that steps (a), (b), (c) and (d) are done at least partially simultaneously. According to another embodiment, the process is characterized in that said displacement of the fronts displaces the fronts synchronously in the different zones.

According to another embodiment, the process is characterized in that the displacement of the fronts comprises the following steps:

(i) creating a circulation loop zone between the different zones, from the first zone to the fifth zone; and (ii) putting in circulation in said loop to displace the fronts. According to another embodiment of the invention, the displacement of the fronts comprises the following steps:

(i) creating a first displacement zone through fluid connection of the outlet of the first zone to the inlet of the second zone and through fluid connection of the outlet of the second zone to the inlet of the third zone, and downstream displacement of the inlet of the first zone to provide the inlet of the first displacement zone and upstream displacement of the outlet of the third zone to provide the outlet of the first displacement zone; and creating a second displacement zone through fluid connection of the outlet of the third zone to the inlet of the fourth zone and through fluid connection of the outlet of the fourth zone to the inlet of the fifth zone and fluid connection of the outlet of the fifth zone to the inlet of the first zone, and downstream displacement of the inlet of the third zone to provide the inlet of the second displacement zone and upstream displacement of the outlet of the first zone to provide the outlet of the second displacement zone; and (ii) introducing a certain volume of rinsing solution at the inlet of the first displacement zone and substantially simultaneously withdrawing the same volume of recovered rinsing solution at the outlet of the first displacement zone.

(iii) introducing a certain volume of rinsing solution at the inlet of the second displacement zone and substantially simultaneously withdrawing the same volume of recovered rinsing solution at the outlet of the second displacement zone.

According to another embodiment of the invention, the process is characterized in that said displacement of the fronts displaces the fronts asynchronously in the different zones. According to another embodiment of the invention, the process is characterized in that the displacement of the fronts comprises the following steps:

(i) creating a first zone of a first displacement through fluid connection of the outlet of the first zone to the inlet of the second zone and through fluid connection of the outlet of the second zone to the inlet of the third zone; and creating a second zone of a first displacement through fluid connection of the outlet of the third zone to the inlet of the fourth zone and through fluid connection of the outlet of the fourth zone to the inlet of the fifth zone and fluid connection of the outlet of the fifth zone to the inlet of the first zone; and (ii) introducing a certain volume of said solution at the inlet of the first displacement zone and substantially simultaneously withdrawing the same volume of a diluted regenerant liquid at the outlet of the first zone of a first displacement;

(iii) introducing a certain volume of regenerant at the inlet of the second displacement zone and substantially simultaneously withdrawing the same volume of a liquid diluted in said ionic metal derivative at the outlet of the second zone of a first displacement;

(iv) creating a first zone of a second displacement through fluid connection of the outlet of the first zone to the inlet of the second zone and through fluid connection of the outlet of the second zone to the inlet of the third zone, and downstream displacement of the inlet of the first zone to provide the inlet of the first zone of a second displacement and upstream displacement of the outlet of the third zone to provide the outlet of the first zone of a second displacement; and (v) creating a second zone of a second displacement through fluid connection of the outlet of the third zone to the inlet of the fourth zone and through fluid connection of the outlet of the fourth zone to the inlet of the fifth zone and fluid connection of the outlet of the fifth zone to the inlet of the first zone, and downstream displacement of the inlet of the third zone to provide the inlet of the second displacement zone and upstream displacement of the outlet of the first zone to provide the outlet of the second displacement zone; and (vi) introducing a certain volume of rinsing solution at the inlet of the first zone of a second displacement and substantially simultaneously withdrawing the same volume of a liquid rich in the relatively less retained impurity(ies) at the outlet of the first zone of a second movement.

(vii) introducing a certain volume of rinsing solution at the inlet of the second zone of a second displacement and substantially simultaneously withdrawing the same volume of a liquid rich in said ionic metal derivative at the outlet of the second zone of a second displacement.

According to another embodiment of the invention, the process is characterized in that step (f) comprises a displacement of the fronts in all of the zones before the periodic displacement. According to another embodiment of the invention, the process is characterized in that the periodic displacement of the injection points is done from one column in one column. According to another embodiment of the invention, the process is characterized in that the periodic displacement of the injection points is done from two columns in two columns. According to another embodiment of the invention, the process is characterized in that said zones comprise at least one column, preferably at least two columns.

According to another embodiment of the invention, the process is characterized in that the volume increment according to which said introduction points and said withdrawal points are displaced corresponds substantially to the volume of an entire fraction of a zone of absorbent material. According to another embodiment of the invention, the process is characterized in that the volume increment according to which said introduction points and said withdrawals points are displaced corresponds substantially to the volume of a column. According to another embodiment of the invention, the columns are provided with multi-way valves.

According to another embodiment of the invention, the process is characterized in that the periodic displacement of the steps is synchronous. According to another embodiment of the invention, the process is characterized in that the periodic displacement of the steps is asynchronous. According to another embodiment of the invention, the process is characterized in that said liquid diluted in said ionic metal derivative is at least partially sent toward step (b).

According to another embodiment of the invention, the process is characterized in that there is an additional zone, and in that it also comprises a step (g) introducing all or part of the liquid diluted in said ionic metal derivative obtained in step (a) at said additional zone, and recovering substantially the same volume in rinsing solution at a point situated downstream from said zone. According to another embodiment of the invention, the process is characterized in that step (b) comprises two sub-steps (b1) and (b2), as well as an intermediate step for adjusting a parameter of the solution, in particular by modifying the pH. According to another embodiment of the invention, the process is characterized in that said liquid diluted in regenerant obtained in step (c) is at least partially sent toward step (d), possibly after having been completed. According to another embodiment of the invention, the process is characterized in that the recovered rinsing solutions are at least partially returned toward steps (a) and/or (c).

According to another embodiment of the invention, the process according to the invention comprises at least 3 columns and 4 fluid lines. According to another embodiment of the invention, the process is characterized in that the chromatography is of the ion exchange type and the ionic metal derivative is a salt selected from the complexes of uranium, gold, copper, zinc, nickel, cobalt, as well as PGM, preferably a salt of uranium and in particular a uranium sulfate. According to one preferred embodiment, the regeneration step comprises a pollution control step with a strong base for example of the potassium or sodium hydroxide type, optionally followed by a rinsing step with water then a step for reconditioning of the resin with an acid, for example sulfuric acid. According to another embodiment of the invention, the process is characterized in that the eluent is sulfuric acid. Lastly, the invention concerns a pollution control device for the implementation of the process according to the invention.

DETAILED DESCRIPTION

Figure 1:
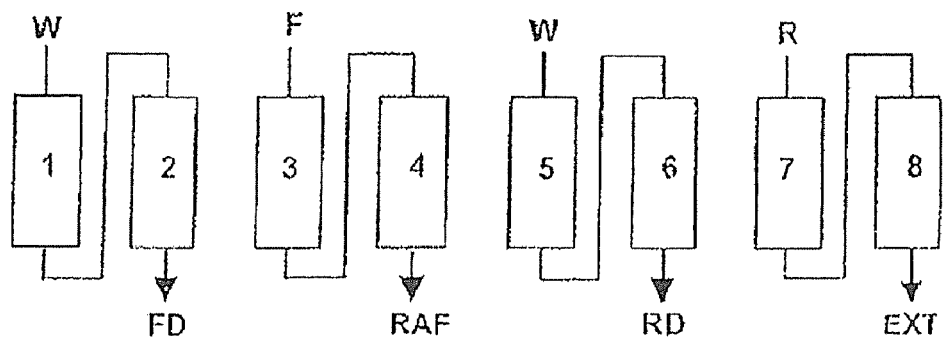
FIG. 1 is a diagrammatic illustration of a SMB embodiment according to the state of the art.
Figure 1:
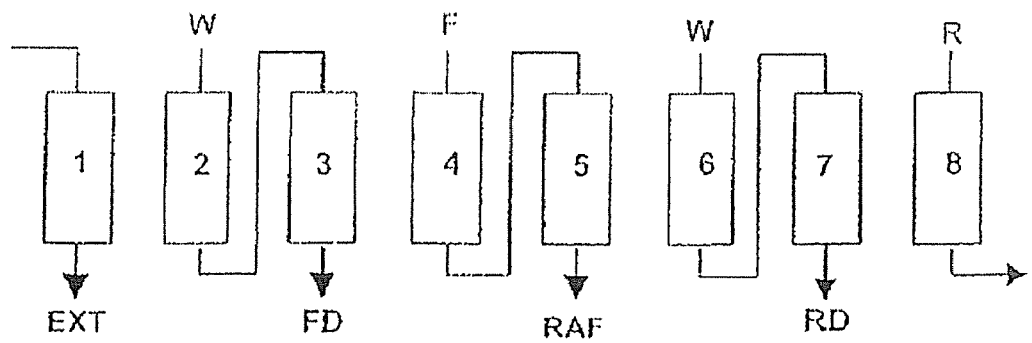

According to the present invention, ionic metal derivative refers to any type of ionized metal complexes, in particular and non-limitingly, the complexes formed by uranium and gold as well as those obtained during the extraction of copper, zinc, nickel, cobalt and PMG (Platinum Group Metals). Preferably, the metal derivative is a complex formed by uranium, and even more preferably a uranium sulfate. The counter-ion can be a sulfate, carbonate or other. In sulfuric solution in particular, the uranium (IV) exists primarily in the form of $UO^{2+}_2$ uranyl cations, but also in complex sulfate form $UO_2SO_4$, $UO_s(SO_4)^{2-}_2$, etc. In the description below, the example of uranium will be used to represent the ionic metal derivatives, but does not, however, limit the scope of the invention to that product alone.

According to the present invention, leaching solution refers to any solution resulting from hydrometallurgical extraction processes, containing, in solution or in suspension, metal derivatives in their ionic form as previously defined. The leaching compositions naturally depend on the geological nature of the ore exploited. Thus as an example, a leaching solution of a uranium ore contains about 100 to 500, for example about 350 ppm of uranium, silica in a quantity of about 200 to 1000, for example about 500 ppm, iron in the amount of about 500 to 20,000, for example around 1000 ppm, for the species mainly present, as well as other compounds such as vanadium. A leaching solution for a copper ore contains from 1 to 5 g/L, for example about 3 g/L of copper, from 3 to 10 g/L, for example about 6 g/L of iron, from 100 to 1000 ppm, for example about 400 ppm of silica, as well as other impurities such as aluminum or manganese. Indeed, aside from vanadium for uranium or iron for copper, among the most typical contaminants are those coming from gangue and in particular silicates. These impurities can interfere with the extraction techniques for the species of interest, tending to attach on the resin and thereby limiting their exchange capacity.

According to the invention, the ionic metal derivative can be the most retained by the stationary phase, but also the least retained by the stationary phase. For example, when the adsorption process according to the invention is used to separate species such as uranium, the impurities are the most retained by the stationary phase and the ionic metal derivative is the least retained. According to the present invention, adsorption step refers to a step during which the load containing the ionic metal derivative to be separated is injected, one or several products contained in the load will then attach on the solid phase. This step corresponds to a loading of the phase.

According to the present invention, desorption step refers to a step during which the product(s) attached on the solid support pass(es) into the liquid phase. An adsorption process therefore naturally comprises at least one adsorption step and at least one desorption step. According to the present invention, rinsing step refers to a step between an adsorption and desorption step or vice versa making it possible to renew the liquid phase contained in the column(s). This step can also be called wash step.

The process of the invention allows better optimization of the load sequences of the leaching solution to be processed and rinsing of the separated products; this leads to a reduction of the volumes used and a lesser production of sub-products. Moreover, the process according to the invention offers one or several of the following advantages:
  mechanical design making it possible to avoid moving parts, since the columns are fixed. The columns are compact and it is possible to use multi-way valves on each column.
  simplified maintenance, because one column can be separated from the cycle without having to stop the process, to change the resin or chromatographic support, general maintenance, etc. . . . . The maintenance requirements are closer to those of a discontinuous process, known for being relatively low.
  process control is simple, since one need only change the parameters of the machine to modify the process and adjust the zones of the process (no mechanical parts need to be changed). It is also possible to use a flowmeter on each column, for each process step.
  capacity extensions are easy to implement, by simply adding columns to the existing columns and modifying the process parameters to modify the zones.
These advantages, as well as others, will be explained if applicable in the description that follows.

For FIGS. 1, 3 to 6, the description is provided in reference to a salt (sulfate) of uranium, but it is understood that the process according to the invention is applicable to all ionic metal derivatives and applies to any type of chromatography well known by those skilled in the art. As a reminder, one will recall that the ionic metal derivative is considered, for the ion exchange, as the extract (X) because it is more exchanged and that the less exchanged impurities are considered as a raffinate (R). The same conventions will be used in the other examples of this application, the terms "more retained" or "less retained" being used when there is no ion exchange.

The ion exchange resins are conventional, like the rinsing and regeneration solutions. In the case at hand and for the metal compounds in anionic form, one will use type I or type II strong anionic resins (polystyrene-divinylbenzene polymer carrying quaternary amine groups, such as Amberjet 4400 CI™, Amberlite 920U CI™, Dowex 21 K™) or weak anionic resins. In the case of metal compounds in cationic form, one will use strong cationic resins (polystyrene-divinylbenzene polymer carrying sulfonic groups, such as Amberlite IR252™) or weak ones. In certain cases, selective resins (polystyrene-divinylbenzene polymer carrying specific chelating groups) will be used. These different resins are either of the gel or cured macro type having a suitable granulometric distribution (Uniformity coefficient close to 1.1; effective size 0.3 to 1.6 mm).

From this perspective, the invention does not stand out from the state of the art for ion exchanges. One can use anionic or cationic resins, weak or strong, depending on the case. One can also use several systems in series; in particular, one can perform a demineralization using a first system with cationic resins followed by a second system with anionic resins.

Figure 3:
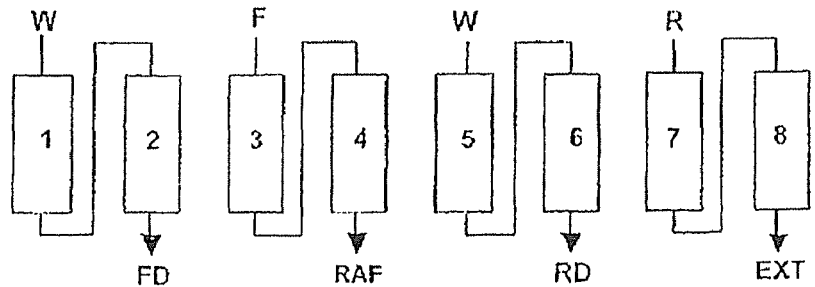
FIG. 3 is a diagrammatic illustration of a first embodiment.
Figure 3:
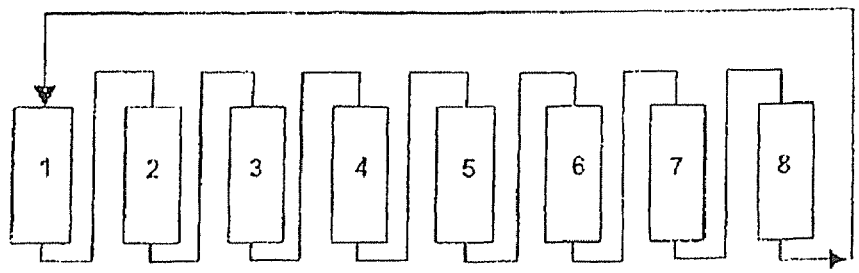
Figure 3:
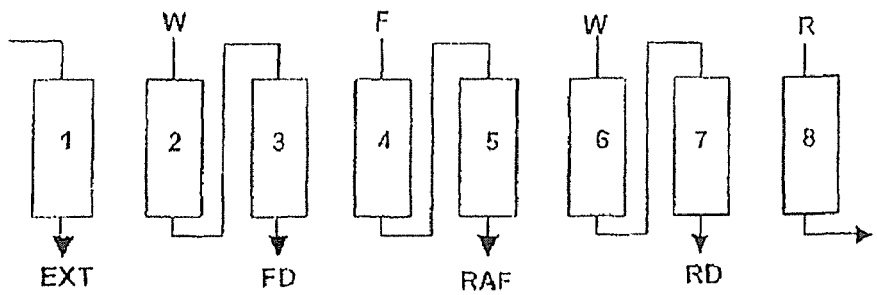
Figure 3:
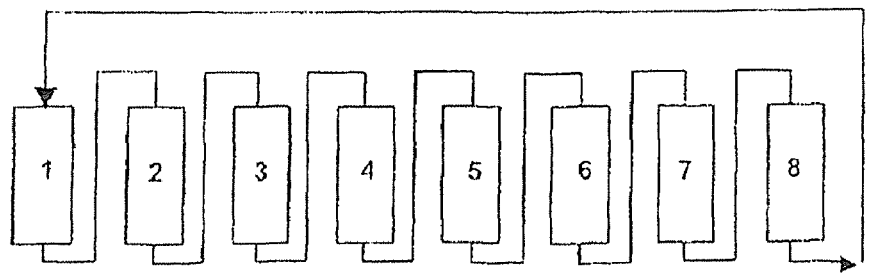
Figure 4:
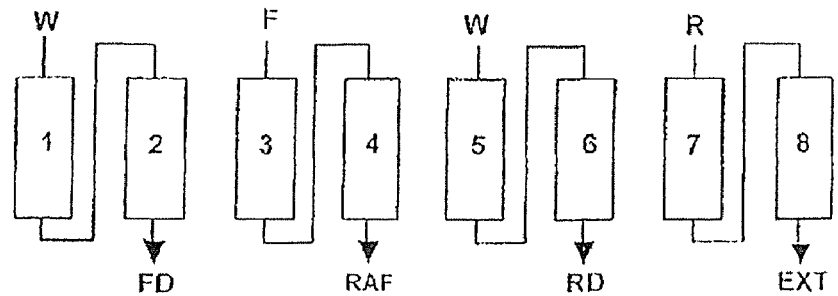
FIG. 4 is a diagrammatic illustration of a second embodiment.
Figure 4:
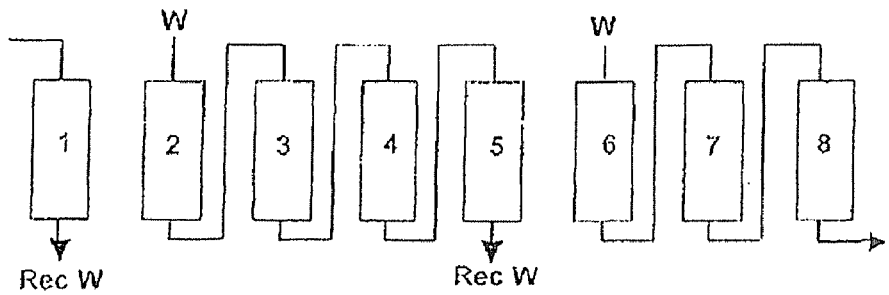
Figure 4:
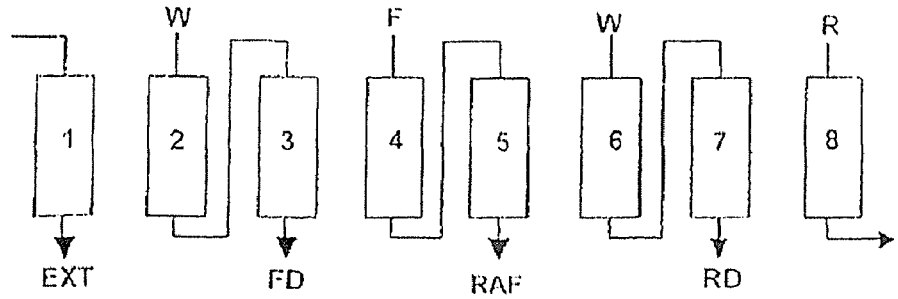
Figure 4:
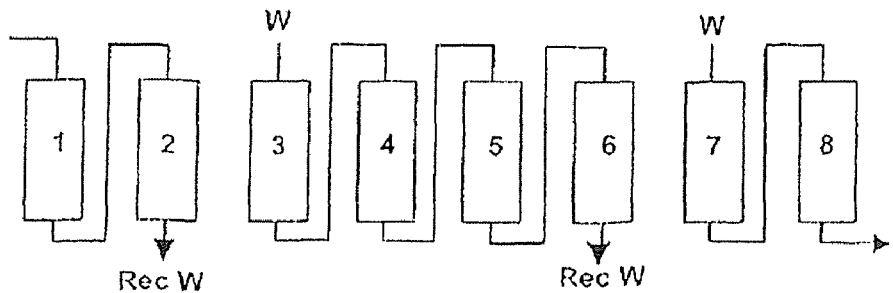
Figure 5:
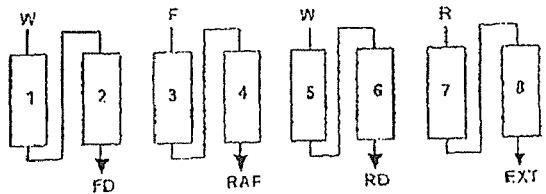
FIG. 5 is a diagrammatic illustration of a third embodiment.
Figure 5:
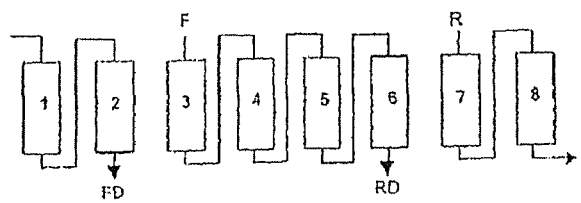
Figure 5:
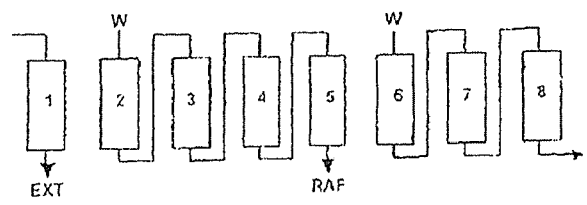
Figure 5:
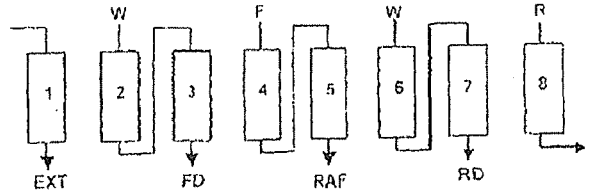
Figure 5:
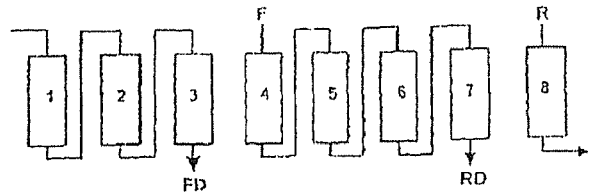
Figure 5:
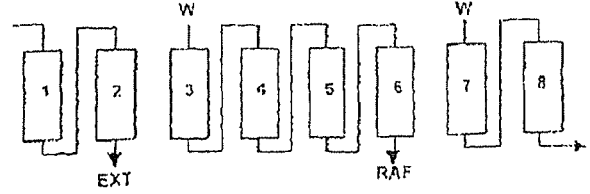

The present invention is illustrated as an example by the following description of three embodiments, done in reference to FIGS. 3 to 5 of the appended drawings, while FIG. 1 describes an embodiment according to the prior art. Uranium salt is used as a representative example of ionic metal derivatives representative of a substance to be purified in an ion exchange chromatography process. In reference to FIG. 1, the facility comprises eight columns 1, 2, 3, 4, 5, 6, 7 and 8 covered with ion exchange resin. The operation of this SMB-type facility according to the prior art is explained infra. It should be kept in mind that the shifting steps go from left to right, which in fact corresponds to a movement of the columns from right to left.

Step (a) comprises the acts aiming to introduce a certain volume of water W at the inlet of the column 1 and substantially simultaneously withdrawing the same volume of diluted metal salt at the outlet of column 2, columns 1 and 2 forming the first zone. During the introduction of the water, at the very beginning of the phase, it should be kept in mind that because of the shift, column 1 is therefore in fact column 2 just before (before the shift). Column 2 just before is filled with the diluted uranium salt solution (that which was not fixed by ion exchange). The pure water front therefore moves downward, and column 1 therefore goes from a "diluted uranium salt" state (with the understanding that there is exchanged uranium salt in that column) to a "water" state (with uranium salt exchanged in that column). Column 2, which is column 3 just before, goes from a "uranium salt" state (with fixed exchanged uranium) to a "diluted uranium salt" state (with fixed exchanged uranium), and one recovers the leaching solution of the ionic metal derivative to be purified in diluted state at the foot of column 2, first relatively concentrated, then increasingly diluted. Indeed on this column there are no more available exchange sites and therefore the diluted solution simply elutes along this column; this is a displacement of uranium solution. This recovered diluted solution is typically returned toward the starting tank of the solution to be purified, or then directly at the head of column 3.

Step (b) comprises the acts aiming to introduce a certain volume of said leaching solution at the inlet of column 3 and substantially simultaneously withdraw the same volume of a liquid rich in raffinate at the outlet of column 4. Column 3 is supplied with leaching solution, but this column corresponds to column 4 immediately before, therefore a column already partially exchanged in uranium salt, and also containing diluted uranium salt that has not been exchanged. Likewise, column 4 corresponds to column 5, but immediately before and therefore a column with water. Column 4 is a preadsorption column since it receives a solution of uranium salt spent by column 3. In column 3, the uranium salt solution is injected and a saturation front progresses in column 3, while the front of the leaching solution and which exchanges on the sites progresses in column 4 (preadsorption column). At the outlet of column 4, one recovers the raffinate, i.e. the elements of the solution to be processed that were not exchanged with the resin, starting from a very diluted solution toward a solution with a higher raffinate concentration.

Step (c) comprises the acts of introducing a certain volume of water at the inlet of column 5 and substantially simultaneously withdrawing the same volume of a liquid diluted in regenerant at the outlet of column 6. Column 5 is supplied with water, while column 6 comes from diluted regenerant. Indeed, column 6 is column 7 just before the shift and therefore just after the shift it receives what comes out of column 5, i.e. water with a little bit of regenerant. What comes out of column 6 is therefore diluted regenerant.

Step (d) comprises the acts of introducing a certain volume of regenerant at the inlet of column 7 and substantially simultaneously withdrawing the same volume of a liquid rich in the metal salt at the outlet of column 8. Column 7 is supplied with regenerant, and is connected to column 8. This column 8 is column 1 just before the shift and therefore just after the shift column 8 is supplied with regenerant, which makes the regenerant front progress in column 8, and one recovers the extract then at the foot of column 8, first diluted, then increasingly concentrated and when the recovered quantity begins to decrease one shifts the steps.

At the end of a given sequence N, one therefore has, at the head of column 1, water and exchanged uranium salt fixed on the resin. At the head of column 2 there is exchanged uranium salt, water and a residue of uranium salt solution to be purified. At the head of column 3 there is completely exchanged uranium salt, with leaching solution to be purified. At the head of column 4, there is in part exchanged uranium salt (all of the sites are not exchanged) and raffinate (part of the leaching solution to be purified that did not attach) and a residue of leaching solution to be purified. At the head of column 5, there is rinse water and the resin sites ready to exchange. At the head of column 6, there is rinse water diluted with regenerant, the sites being regenerated. At the head of column 7, there are completely regenerated sites (ready to exchange uranium salt) and regeneration solution. At the head of column 8, there are partially regenerated sites and diluted regeneration solution and extract (partially).

Therefore at the very beginning of the following sequence N+1, and in reference to a diagram in which the columns are displaced to the left by displacement of the injection and withdrawal points to the right, one then has the following positions. Water is sent onto column 2, which has, at its head, exchanged uranium salt, water and residue of leaching solution to be purified. At the head of column 3 there is completely exchanged uranium salt, with leaching solution to be purified, which will then receive what comes out of column 2. At the head of column 4, there is in part exchanged uranium salt (all of the sites are not exchanged) and raffinate (part of the solution of uranium salt to be purified that has not attached) and a residue of leaching solution to be purified, and this column then receives the leaching solution to be purified. At the head of column 5, there is rinse water and the sites of the resin ready to be exchanged, and which receives what comes out of column 4, i.e. a raffinate and depleted uranium salt solution that will exchange on this preadsorption column. At the head of column 6, rinse water is supplied on a column having regenerated sites, and containing diluted regenerant solution. Column 7, which also has completely regenerated sites (ready to exchange uranium salt) then receives water from column 6 and diluted regeneration solution that is removed at the foot. At the head of column 8, there are partially regenerated sites and diluted regeneration solution, and one supplies with a regenerant solution.

The flows that will come to the head of the columns are therefore the following. At the head of column 2 the leaching solution comes onto a column already having partially exchanged uranium salt at the head. There is therefore a rupture of the fronts and a gradient that is not respected. At the head of column 8 the regeneration solution comes onto a partially regenerated column with diluted regenerant, and therefore one proceeds locally with a mixture of pure regenerant with impure regenerant. Once again the gradient is not respected. One therefore sees that although the classic SMB system, applied to the field of ion exchange resins, has the advantage of being continuous, is still not free of flaws, which are especially sensitive in terms of the regeneration.

The invention makes it possible, owing to a step for displacement of the fronts in the zones before the periodic displacement, to free oneself from this problem and respect the gradients. The step for displacement of the fronts is typically done with one column. The following description refers to three embodiments. The displacement of the fronts is done by injection of a fluid chosen in the columns, or the fluids existing by closed-loop circulation, by water injection (the rinse liquid) or by load and regenerant injection followed by water injection.

In FIGS. 3, 4 and 5, the facility is identical in terms of columns, only the operating mode of the columns differs, and the possible presence of intermediate tubs (not shown). The facility comprises columns (1, 2, 3, 4, 5, 6, 7 and 8) covered with the same quantity of one of the resins suitable for this invention and as previously defined. These columns are arranged in a series, each including an inlet and an outlet. In general, as will appear below, each inlet can receive the aqueous solution to be treated, the regeneration solution, water, recovered water, acidified uranium salt, sulfuric acid. Generally, as will appear below, each outlet can produce diluted uranium salt, raffinate, extract, recovered water, diluted sulfuric acid, uranium salt (extract). Each column is also connected to the upstream and downstream columns.

Figure 2:
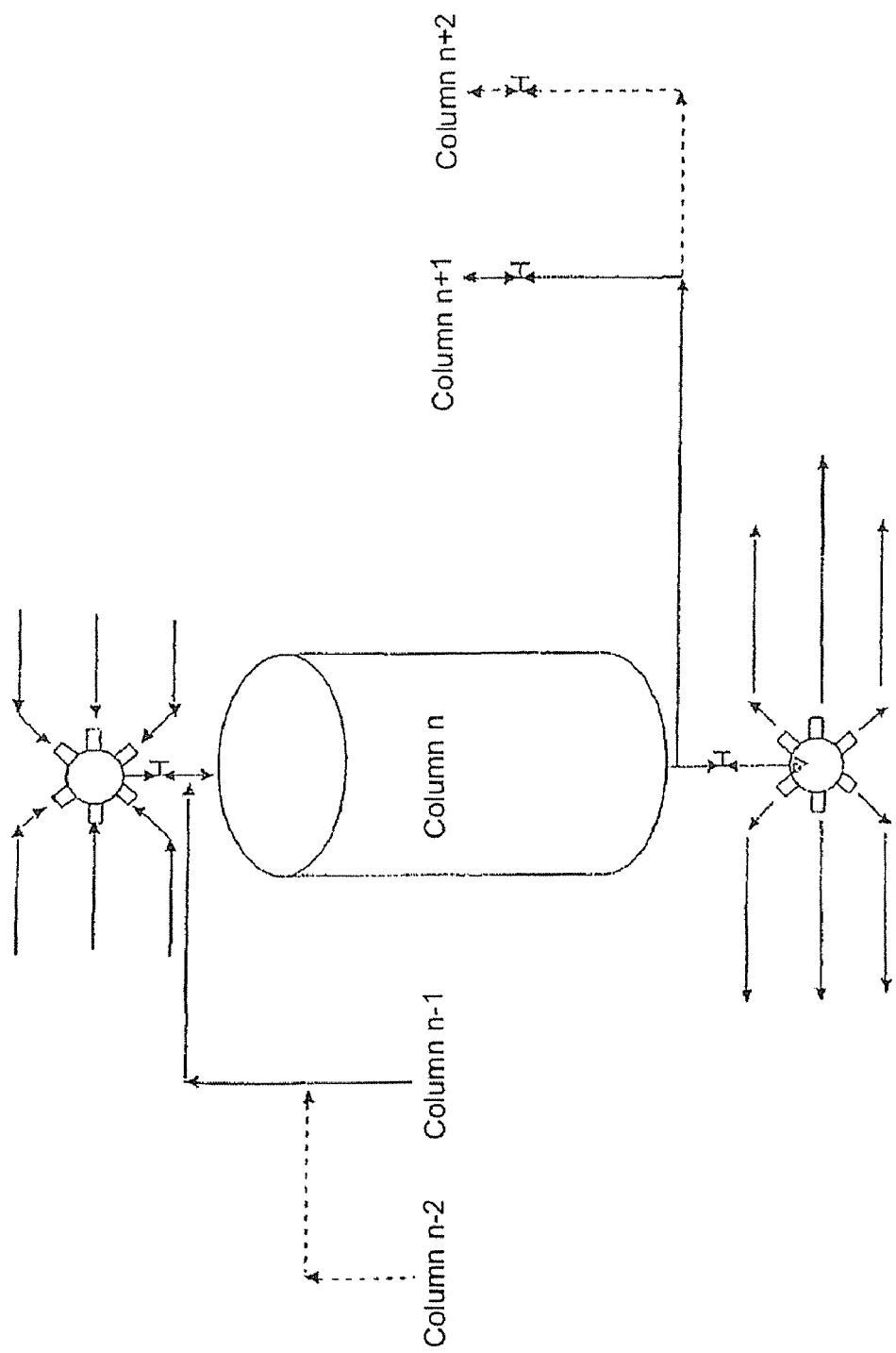
FIG. 2 is a diagrammatic illustration of a column in its environment in a facility according to one embodiment of the invention.

This principle is illustrated in FIG. 2. As shown in FIG. 2, the valves can be multi-way valves, in particular with 6 ways. These multi-way valves are known in themselves, and are controlled traditionally by an electric motor. Advantageously, the valves are actuated to turn by one increment each time in an operating mode. For certain modes, the valves can be actuated to cause them to turn by several sectors, such as for example when one wishes to isolate a column to proceed to a specific sequence on that column.

In reference to the first embodiment illustrated in FIG. 3, after the sequence N, identified by sequence 1.1 in the figure, one has the arrangement described above in reference to the SMB system. The fronts are then moved during sequence 1.2. This displacement is obtained by putting the columns in a loop and putting in circulation. This displacement is done by one increment of one column, by putting fluids in circulation in the loop. The displaced volume corresponds to the volume of a column.

At the beginning of sequence N+1, one therefore obtains the following columns. Column 4 therefore has, at the head, partially exchanged sites and in terms of fluid what was at the head of column 3 (the sites already exchanged do not change), therefore leaching solution to be purified (therefore a composition substantially identical to what the column will receive next). Column 8 then has partially regenerated sites and regenerant solution (therefore a composition substantially identical to what the column will receive next). Thus the supply of the columns is done with a constant gradient, since the concentrations do not change at the head of these columns. This is also true for the other columns. Column 6 has at the head what was at the head of column 5, i.e. water, and will also receive water. Column 2 has at the head what was at the head of column 1, i.e. water, and will also receive water.

In reference to the second embodiment illustrated in FIG. 3, after the sequence N, identified by sequence 1.1 in the figure, one has the arrangement described above in reference to the SMB system. One then moves the fronts during sequence 1.2. This displacement is obtained by putting two displacement zones into circulation. The first displacement zone is the zone comprising columns 2, 3, 4 and 5. The second displacement zone is the zone comprising the columns 6, 7, 8 and 1. This displacement is done by one increment of one column, by water injection at the head of the displacement zones. The displaced volume corresponds to the volume of one column.

One therefore obtains, at the beginning of sequence N+1, the columns as in the first embodiment. The difference comes from the displacement of a water column volume. Indeed, between the two parts of the production/regeneration process, there is a water buffer to avoid contamination of the different species. This water buffer is simply displaced in the first embodiment, whereas it is replaced in the second embodiment. In the second embodiment, one then recovers, at the foot of columns 1 and 5, the volume of water in a column, therefore recovered water (Rec W). This recovered water is sent toward an intermediate pool, and can be used to supply the columns with rinse water. One can also use this water in part with fresh water for rinsing. The other sequences are like those in the first embodiment.

In the first and second embodiments, the displacement of the fronts is synchronous, since all of the fronts move at the same time by one volume increment. The entering fronts move synchronously with the exiting fronts. In the first and second embodiments, the subsequence without load injection corresponds to subsequence 1.2 (or 2.2, depending on the considered sequence).

In reference to the third embodiment illustrated in FIG. 5, after the sequence N, identified by sequence 1.1 in the figure, one has the arrangement described above in reference to the SMB system. One then proceeds with a first displacement of the fronts during sequence 1.2. This first displacement is obtained by putting the first two first displacement zones into circulation. The first zone of first displacement is the zone comprising columns 3, 4, 5 and 6. The second zone of first displacement is the zone comprising columns 7, 8, 1 and 2. One injects uranium salt solution into column 3, which causes a first displacement in the first zone. Column 4 then has at the head a leaching solution to be purified. The content of column 6 is recovered at the foot, and is diluted regenerant. Regenerant is injected into column 7, which causes a first displacement in the second zone. Column 8 then has a regenerant solution at the head.

One then proceeds with a second displacement of the fronts during sequence 1.3. This second displacement is obtained by putting two zones of second displacement into circulation. The first zone of second displacement is the zone comprising columns 2, 3, 4 and 5. The second zone of second displacement is the zone comprising columns 6, 7, 8 and 1. This time one injects water into columns 2 and 6. One then causes a second displacement of the fronts. The composition of the head of column 3 ends up at the head of column 4; this again is leaching solution to be purified. From this perspective, the composition of the head of column 4 has not changed during this second displacement. Likewise, at column 8 one obtains the composition of the head of column 7, i.e. regenerant. From this perspective again, the composition of the head of column 8 has not varied. What varied during this second displacement are the compositions in columns 5 and 1, since raffinate was obtained at the foot of column 5 and extract at the foot of column 1. During this second displacement, the water "buffer" was reformed between the two parts of the production/regeneration process to avoid the contamination of different species.

In the third embodiment, the displacement of the fronts is asynchronous, since all of the entering fronts do not move synchronously with the exiting fronts. In the example, the entering fronts are first displaced, then the exiting fronts are displaced, but it is also possible to do the reverse. In the third embodiment, the subsequence without injection of the load corresponds to subsequence 1.3 (or 2.3, depending on the considered sequence).

The number of columns in a displacement zone or in a zone corresponding to zones (a), (b), (c) and (d), is not necessarily constant. It can be beneficial to vary the number of columns in each zone to take full advantage of each column. For example, it is possible to have a first set of columns in elution (displacement columns) whereof the number is constant, while the production and regeneration zones have variable lengths, for example two columns in production and one column in regeneration, then one column in production and two columns in regeneration. As another example, if one considers a set of M columns, one can have a complete sequence (set of all of sequences (a), (b), (c), (d) and displacement) on M-1 or M-2 columns or M-m columns. One can then isolate one, two or m columns, for example for maintenance, on the resin bed or on the set of valves and conduits attached to that column.

Indeed, the process according to the invention makes it possible to carry out a chosen step on a chosen column, independently of the other columns, if necessary. This is impossible with the continuous processes of the state of the art. For example, as indicated, one column can be isolated. It is thus possible, within a given sequence, to change the supply of a column. When a column receives water, one can first use recovered water and then send fresh water onto that column, which makes it possible to optimize water consumption. One can also supply a column with variable loads or variable regeneration solutions. Relative to the processes according to the state of the art, one can better play on the rinse and production flows. In particular, the processes of the state of the art provide for continuously diluting the supply through rinse water. This leads, among other things, to increasing the passage speed in the adsorption zone (ion exchange). The optimum hydraulic conditions for each step of the sequential are therefore not respected in the continuous processes of the state of the art. The invention makes it possible to better take advantage of the optimum hydraulic conditions, by optimally managing each step, since the duration of steps (a), (b), (c) and (d) is not necessarily the same. The flows are therefore optimized in each column. The process can be optimized to obtain optimized column supply fluids, by completing the fluids exiting the columns for reuse in the following columns.

Figure 6:
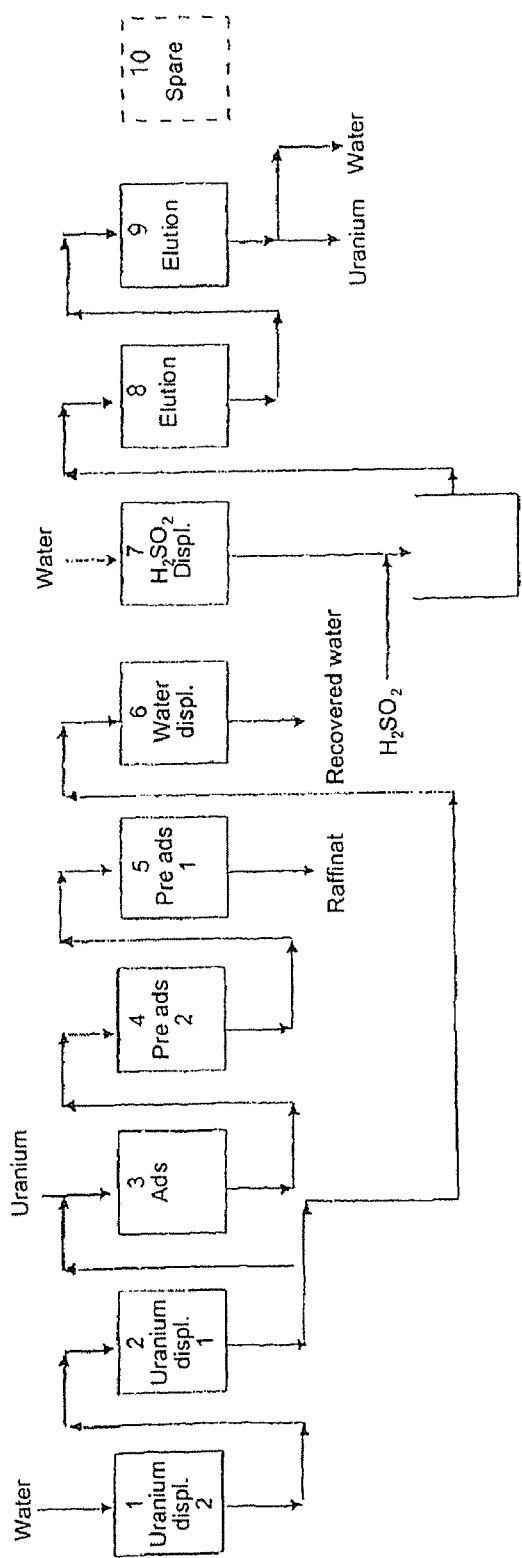
FIG. 6 is a diagrammatic illustration of a fourth embodiment.

It is also possible to have other displacement columns, in particular an additional displacement column at step (b), and to thus have an additional step for production of recovered water. This embodiment is illustrated in FIG. 6, which comprises the use of 9 columns. Columns 1 and 2 and 3 correspond to columns 1 and 2 and 3 in FIGS. 3, 4 and 5. Columns 4 and 5 correspond to column 4 in FIGS. 3, 4, 5. Column 6 is new relative to the embodiments of FIGS. 3, 4 and 5. Column 7 corresponds to columns 5 and 6 in FIGS. 3, 4, 5. Columns 8 and 9 correspond to columns 7 and 8 in FIGS. 3, 4 and 5. The operating mode is identical to that for the embodiments of FIGS. 3, 4 and 5. The putting into circulation applies identically here. Likewise, one can define two displacement zones according to the second embodiment as follows: the first displacement zone comprises columns 2 to 7 and the second displacement zone comprises columns 8, 9 and 1. One can thus define first and second displacement zones according to the third embodiment. The first and second zones of first displacement comprise columns 3 to 7 on one hand and 8 to 2 on the other. The first and second zones of second displacement comprise columns 2 to 7 on one hand and 8, 9 and 1 on the other hand. In the embodiment of FIG. 6, the flow exiting column 3 directly supplies column 4. In the embodiment of FIG. 6 (as for the other embodiments), the pH of the different fractions sent onto the columns can be adjusted. For example, it is possible to ensure that the pH of the fraction having been in contact with the most loaded column (here 3) is less than 2 before being sent to the following column. By changing the pH, it is also possible to vary the type of ionic metal derivative preferably fixed on the resin. It is also possible to feed the leaching solution on several columns in parallel.

The invention is also applicable to all types of separation by chromatography on all types of products. In particular, the process according to the invention can use 5 (or more) input fluids:

Feed fluid (Feed): this liquid contains the feed to be processed and its pH buffer composition, salinity making it possible, by injecting this fluid on a column, to adsorb the molecule of interest on the stationary phase. At the end of the feed stage, the column contains a stationary phase on which the ionic metal derivative is adsorbed, the liquid phase situated in the column is made up of feed diluted (FD).

Rinse fluid, with a salinity and pH identical to the feed fluid, but not containing a feed to be processed. This step renews the liquid phase of the column and makes it possible to eliminate the compounds of the feed that are not retained by the stationary phase. In the case of a uranium salt, for example water or aqueous acid is used.

Elution of the desired species: a fluid of a nature modifying the nature of the interactions between the target molecule and the stationary phase makes it possible to cause the target molecule to desorb from the stationary phase, the target molecule is then collected in the exiting liquid. To elute the uranium sulfate, a typical eluent according to the invention is sulfuric acid, whereas when the uranium is in the form of a uranium carbonate, the complex is eluted either by sodium chloride, or by solutions of ammonium or sodium carbonates.

Regeneration: after the elution, impurities may remain strongly adsorbed on the stationary phase, which can be detrimental to the stability or sanitary nature thereof. We have seen that these pollutants can be silica or iron in the case of the extraction of uranium and copper. A fluid containing acid additives such as sulfuric acid can thus be used. In the case of uranium salt, previously described, the elution steps of the desired species and regeneration are done simultaneously, the regenerant (sulfuric acid) exchanging the sites of the resin to release uranium salt.

The injection of a solvent corresponding to the rinse fluid used after the feed makes it possible to empty the column of the regeneration solvent(s) before performing the next feed. One thus keeps a buffer between the feed and the end of the regeneration; this is equilibration.

The optional injection of a pollution control fluid will make it possible to decontaminate the resin of impurities, and in particular silica that has attached on the resin in competition with the uranium, thereby limiting the feed and elution kinetics. Typically in the case of the invention, a base, preferably strong such as sodium hydroxide or potassium hydroxide, can be used as decontaminating fluid.

The invention offers a method that makes it possible to carry out the 5 steps:

Step a: called equilibration, during which the equilibration solution is injected on at least one column of the system to empty it of the regeneration solvent it contains. Downstream from the equilibration zone, the withdrawn fluid will first be made up primarily of the regeneration solution, then primarily of the equilibration solution;

Step b: called feed, during which the feed solution to be processed is injected. The molecule of interest is then fixed on the chromatographic support with other impurities. At the outlet of this zone, downstream from the injection point, the withdrawn fluid then contains the least retained impurities.

Step c: called wash, during which a wash is done of the column where one replaces the liquid phase containing in particular impurities not retained by the wash solvent.

Step d: called elution, during which one injects a solution modifying the interactions of the molecule of interest with the chromatographic support making it possible to thus elute the molecule of interest. At the outlet of the elution zone, the withdrawn fluid will first contain the wash solution, then a solution rich in ionic metal derivative.

Step e: called regeneration, during which one injects a regeneration solution making it possible to release the impurities very strongly adsorbed on the support.

In the invention, the periodic displacement of the injection points can be done from one column in one column; thus one can manage each column (or zone) independently. The invention makes it possible to operate each column (or zone) independently; in particular the displacement of the injection/ withdrawal points can be synchronous, asynchronous, like the displacement step of the fronts can be synchronous or asynchronous, and can be implemented column by column (or zone by zone). One can also operate with one column (or zone) for one operation or with several columns (or zones) for other operations; thus one can displace the injection/withdrawal points and the fronts of one column for a given zone and of two or more columns for another given zone.

Figure 7:
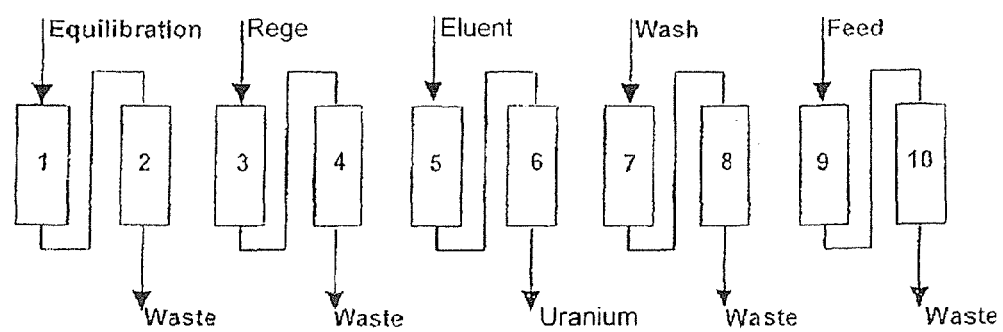
FIG. 7 is a diagrammatic illustration of a SMB embodiment according to the state of the art.
Figure 7:
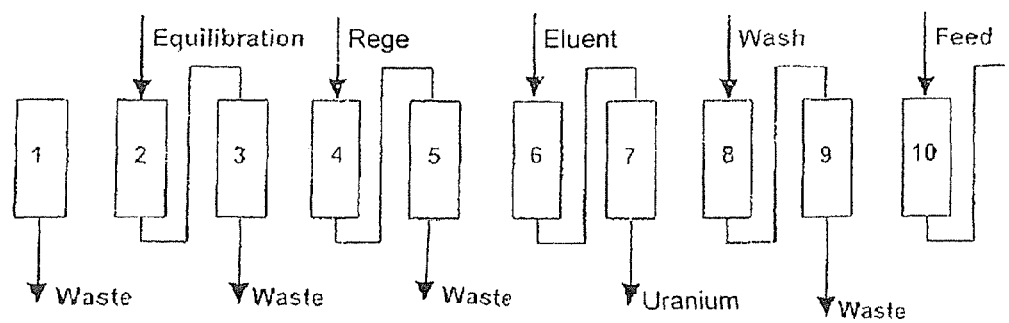
Figure 8:
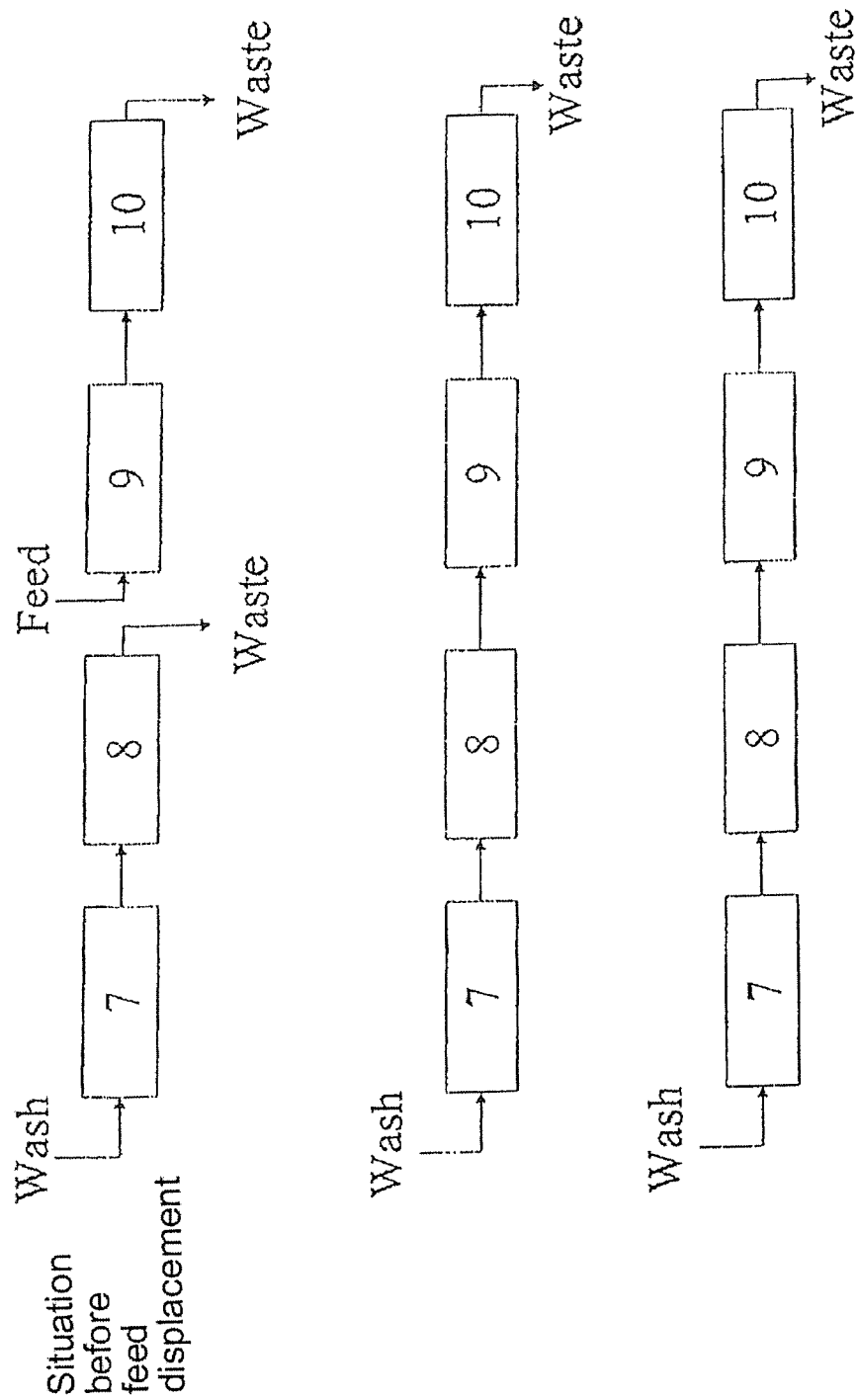
FIGS. 8a and 8b are diagrammatic illustrations of a displacement of the fronts corresponding to a transition sequence according to one embodiment of the invention.
Figure 8:
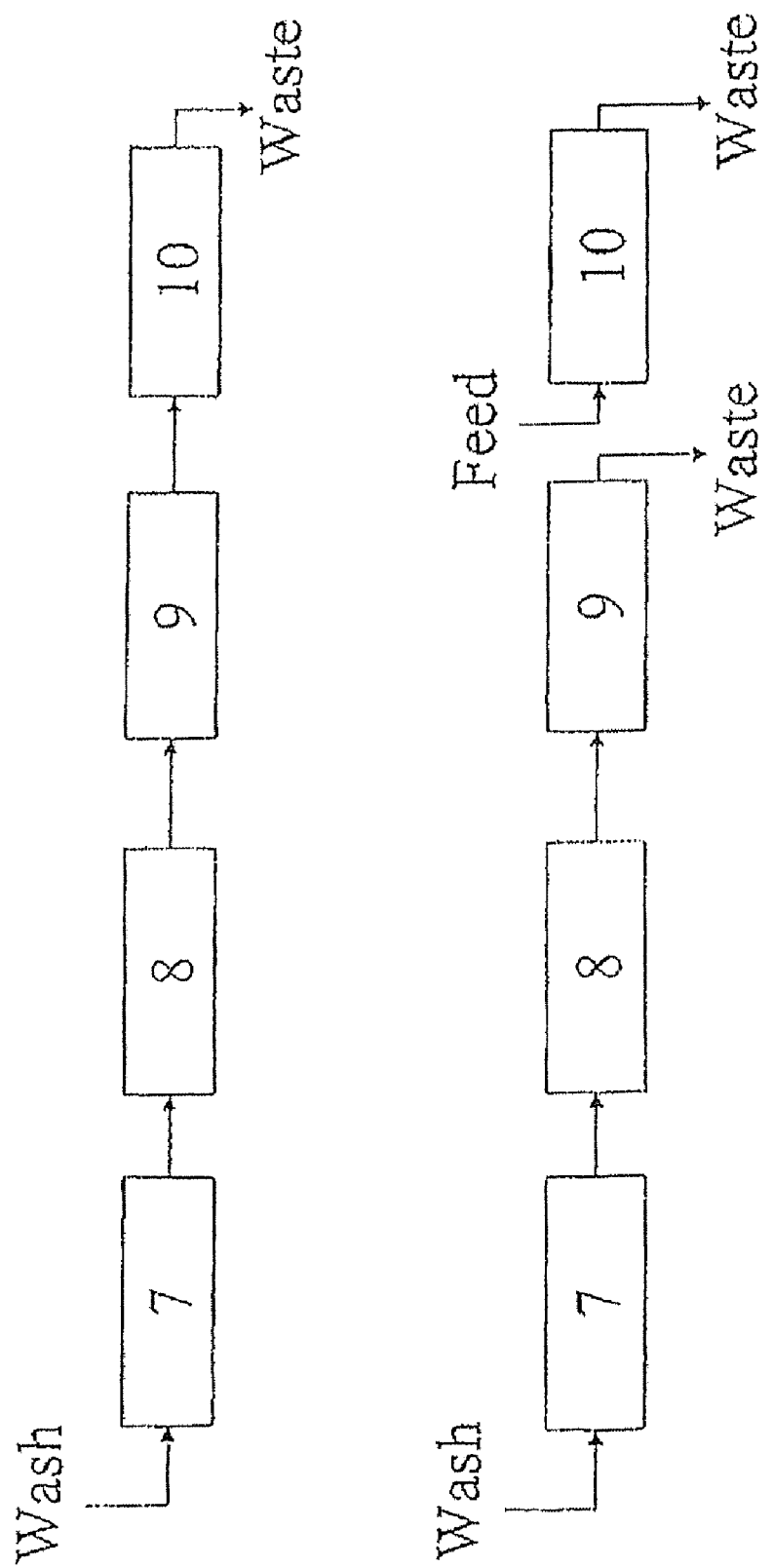
Figure 9:
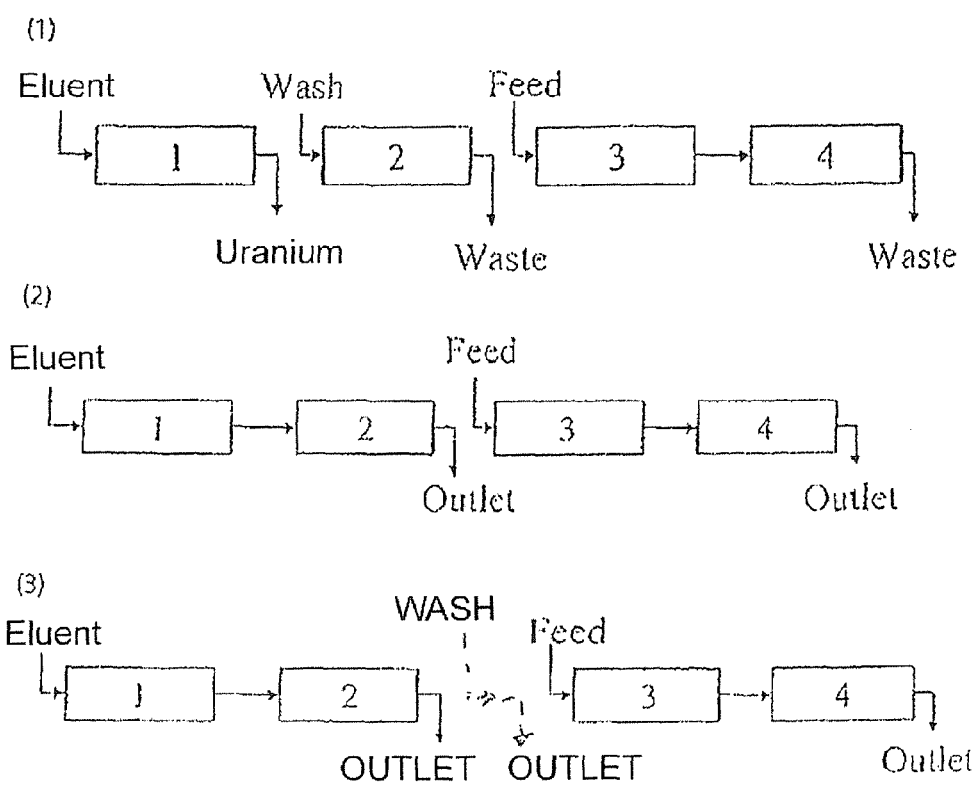
FIG. 9 is a diagrammatic illustration of an asynchronous displacement of a rinsing injection line according to another embodiment of the invention.
Figure 10:
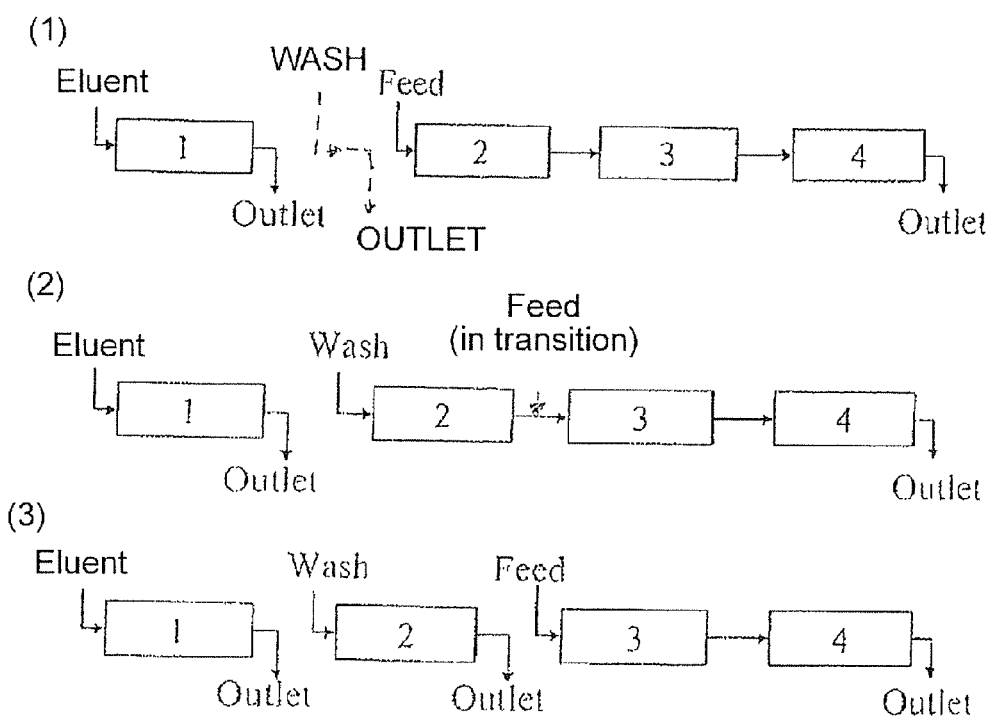
FIG. 10 is a diagrammatic illustration of an asynchronous displacement of the load line with a transition sequence according to another embodiment of the invention.

FIG. 7 shows a process according to the prior art with synchronous multiple columns, periodic and non-sequenced, and involving different fluid inlets. Between each of these inlets, a zone can be defined: for example between the feed (Feed) inlet and the equilibration liquid inlet, the feed zone is defined. Between the rinse solution (Wash) and the feed (Feed), the rinse zone is defined, etc. . . . . . These zones correspond to the first, second, third, fourth and fifth zones of the process according to the invention (in the case of metal salt and ion exchanging resin, the fourth and fifth zones can be combined and the eluent and regenerant are a same fluid). The periodic displacement is also illustrated in FIG. 7. Here we see the principle illustrated in Figure (which corresponded to the case with four fluids).

Column no. 9, at end of period, is in feed configuration. After the switch it is situated just before the outlet of the wash step. Consequently, what comes out of this column just after the switch of the lines still contains the feed, therefore containing the unpurified ionic metal derivative, which is de facto diluted and lost.

In the present invention, the feed line as well as each fluid inlet line can in fact move freely relative to the others with the possibility of having a subsequence of displacement of the fronts. Indeed, each displacement of the fronts can be done line by line, synchronously or asynchronously, and also line by line. All combinations are possible, with the understanding that the displacement of the fronts comprises at least the displacement of the front of the feed, preferably also the displacement of the regenerant front. This displacement of the fronts, at least at a column that is in the feed phase, is impossible with the systems according to the state of the art.

It is also possible to proceed with a displacement of the fronts according to an increment of one column, but also by an increment smaller or larger than one column. The use of an asynchronous mode makes it possible to reduce the total number of columns by having several zones coexist in a same column for a given period.

Figure 11:
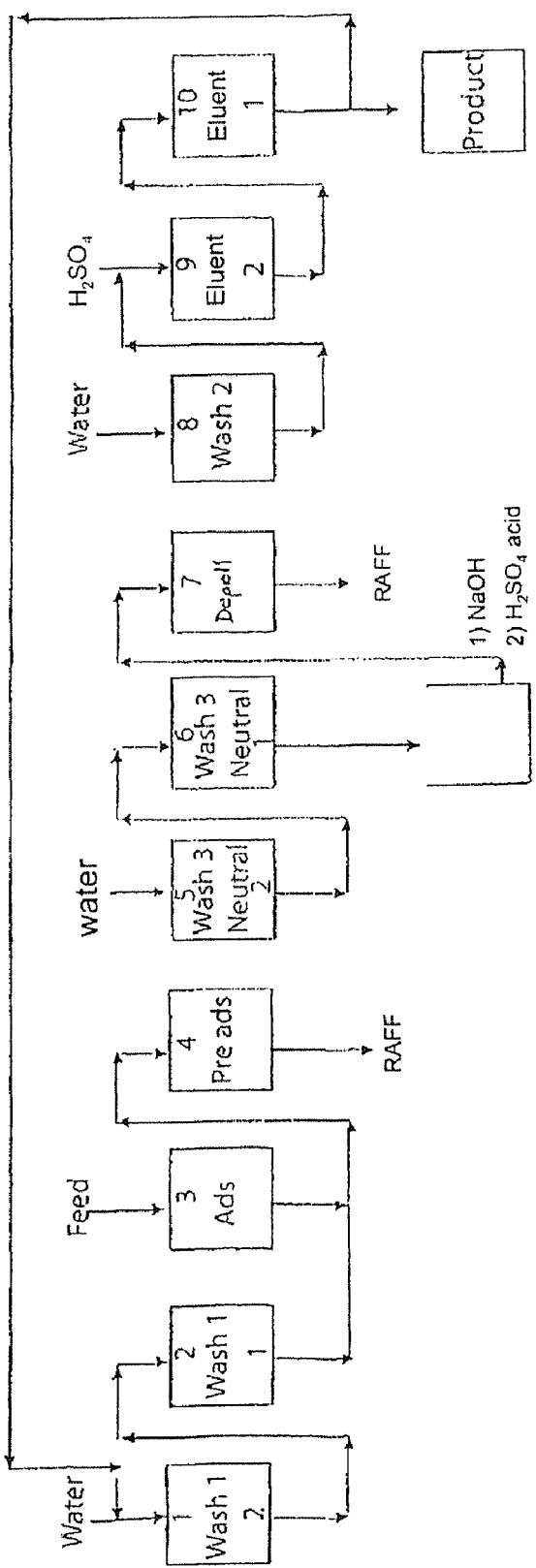
FIG. 11 illustrates a process according to the invention with 6 fluid lines.

FIG. 11 is an example of a process according to the invention with several fluid lines, here 8. In the case shown in FIG. 11, we have shown the separation of an impurity as previously defined. In the embodiment, columns 1 and 2 are supplied with water as rinse solution, and a diluted ionic metal derivative solution is obtained at the outlet. The feed supplies the adsorption column 3 while the preadsorption column downstream is supplied by the outlet of column 3 (which can be combined with the outlet of the wash column 1, diluted feed solution) and an effluent is obtained at the outlet of the preadsorption column (raffinate). Columns 5, 6 and 7 are used to eliminate one or several impurities according to a pollution control procedure depending on the considered impurity. In the case of silica, pollution control will be done using sodium hydroxide, followed by a regeneration of a resin with sulfuric acid. Each processing step being followed by a rinse step. Column 8 is subjected to a wash with water, and the effluent is doped with sulfuric acid. This solution is an eluent solution that is sent onto columns 9 and 10, for which the effluent is the extract. This extract provides the ionic metal derivative and the separated water can be recycled in the process (shown here in return toward the wash of columns 1 and 2).

Figure 12:
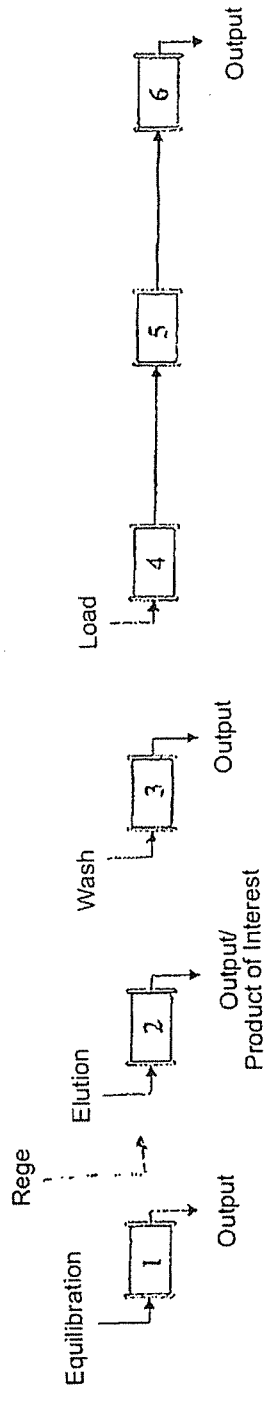
FIGS. 12a, 12b, and 12c illustrate the different sequences of a process according to the invention done with 5 fluids.
Figure 12:
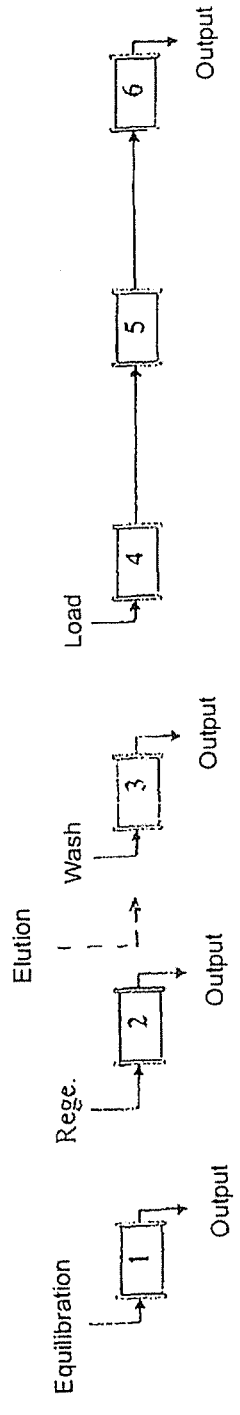
Figure 12:
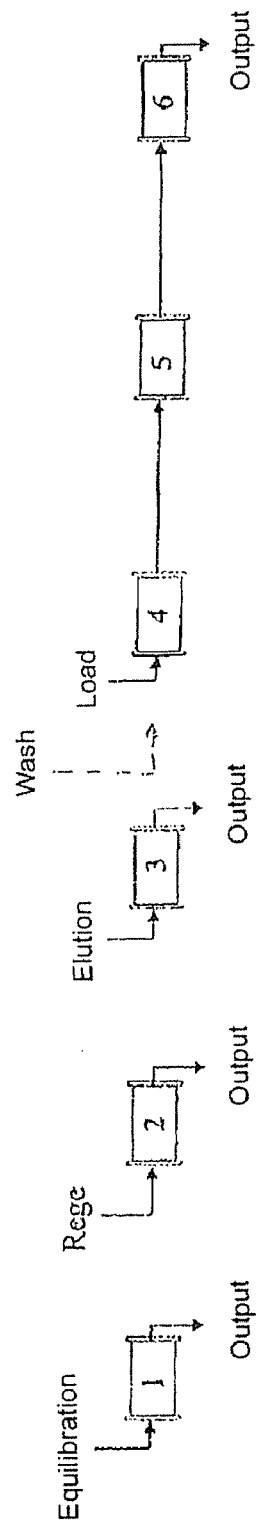
Figure 12:
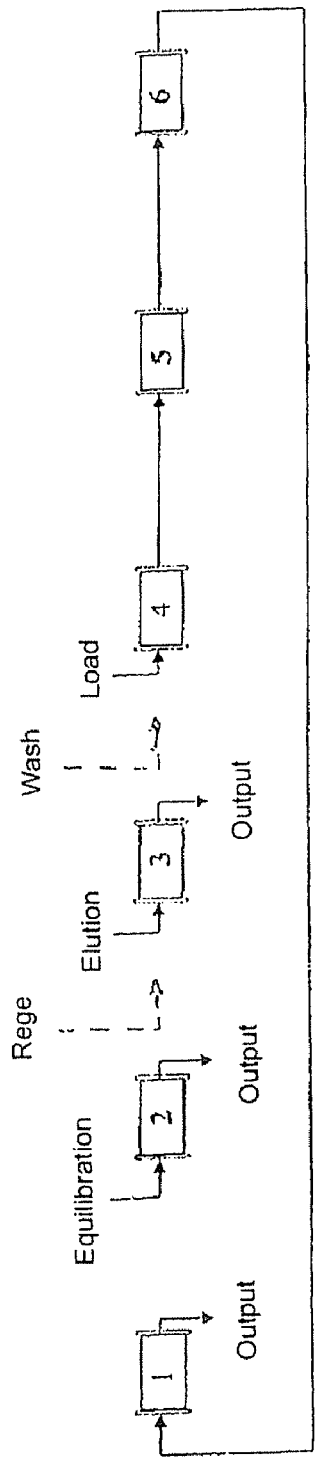
Figure 12:
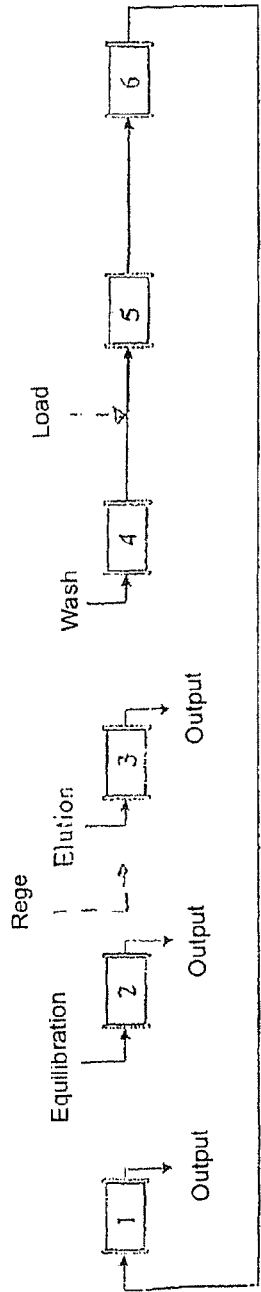
Figure 12:
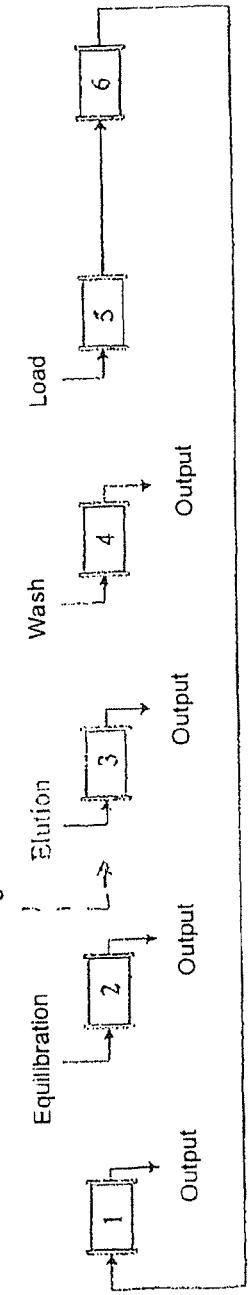

While the process described in FIG. 7 showed the implementation of these steps according to a non-sequenced periodic process in which a displacement of the injection lines of the different solutions is done synchronously and non-sequenced, FIG. 12 shows a process in which the displacements are asynchronous and sequenced. FIG. 12 therefore shows an example of the implementation of steps (a) to (e) according to the invention on a 6-column system whereof the period is broken down into 5 subsequences corresponding to the displacements of certain injection lines at various moments of the Sequence.

At the beginning of the first sequence the situation is the following:

the injection line of the equilibration solution is in column 1 the injection lines of the regeneration and elution solution are in column 2. As previously explained, in lines are superimposed, the downstream line prevails, in this case the elution solution injection line.

the injection line of the wash column is in column 3 the injection line of the feed solution to be processed is in column 4.

This configuration corresponds to subsequence 1.1, which lasts from t=0 to for example t=0.24*Δt.

At the end of subsequence 1.1, a column is displaced, for example the elution line. When subsequence 1.2 begins, the configuration is the following:

the injection line of the equilibration solution is in column 1 the injection line of the regeneration solution is in column 2 the injection line of the elution solution is superimposed on the injection of wash solution in column 3. The downstream line prevailing, the wash solution is injected in column 3.

the injection line of the feed solution to be processed is in column 4.

Subsequence 1.2 lasts for example from t=0.24*Δt to t=0.36*Δt.

At the end of subsequence 1.2, the wash line is displaced for example. When subsequence 1.3 begins, the configuration is the following:

the injection line of the equilibration solution is in column 1 the injection line of the regeneration solution is in column 2 the injection line of the elution solution is in column 3 the injection line of the wash solution is superimposed on the injection line of the feed solution to be processed in column 4. The feed being downstream from the wash, the feed injection prevails. The feed solution to be processed is therefore injected into column 4.

Subsequence 1.3 lasts for example from t=0.36*Δt to t=0.60*Δt.

At the end of subsequence 1.3, the equilibration and regeneration lines are displaced simultaneously. When subsequence 1.4 begins, the configuration is the following:

the injection line of the equilibration solution is in column 2 the injection line of the regeneration solution is superimposed on the injection line of the elution solution in column 3. The downstream line that prevails in this case is the injection of the elution solution.

the injection line of the wash solution is superimposed on the injection line of the feed solution to be processed in column 4. The feed being downstream from the wash, the feed injection prevails. The feed solution to be processed is therefore injected in column 4.

Subsequence 1.4 lasts for example from t=0.60*Δt to t=0.76*Δt.

At the end of subsequence 1.4, a transition is performed corresponding to the displacement of the ionic metal derivative contained in the liquid phase of column 4 toward column 5. To do this, one stops injecting the feed solution to be processed, there is therefore a transition from feed step (b) corresponding to the displacement of the fronts of concentrations of the liquid phase of the impurities not retained and the ionic metal derivative by step (c). The transition is therefore a stop of the injection of the feed to be processed corresponding to the displacement of the fronts induced by step (c).

When subsequence 1.5 begins, the configuration is the following:

the injection line of the equilibration solution is in column 2 the injection line of the regeneration solution is superimposed on the injection line of the elution solution in column 3. The downstream line that prevails in this case is the injection of the elution solution.

the injection line of the wash solution is in column 4.

Subsequence 1.5 lasts for example from t=0.76*Δt to t=Δt.

At the end of subsequence 1.5, the first period is finished, the feed solution to be processed is injected into column 1.5. Subsequence 2.1 of sequence 2 can therefore begin. One notes that subsequence 2.1 of sequence 2 is similar to subsequence 1.1 of sequence 1 except that the lines are shifted by one column.

It therefore appears that the asynchronous displacement of the lines makes it possible to perform in sequence 1 on column 2, the elution, regeneration and equilibration steps, de facto, which makes it possible to reduce the number of columns relative to a process using a synchronous displacement. It also appears that owing to the invention, the transition sequence corresponding to stopping the injection of the solution of the feed to be processed (step (b)) makes it possible to avoid losing the ionic metal derivative still contained in column 4 at the end of sequence 1.4.

One can also use several lines of eluents, for example to process solutions containing several ionic metal derivatives, which are desorbed or exchanged under different conditions. A first eluent will make it possible to selectively recover the first ionic metal derivative while a second eluent will make it possible to selectively recover the second ionic metal derivative. One application example includes the recovery of proteins from milk.

In the description of the present invention, the term "column" must be understood as meaning a physical column or any other part of a column identifiable as a cell, when the physical column comprises injection and withdrawal points at several levels. A single physical column can thus be divided into several sections or cells, and the invention can apply to that configuration. The invention therefore applies to all products of interest capable of being separated by chromatography. For example, the invention makes it possible to separate ionic metal derivatives such as uranium salt, the stationary phase being an ion exchange resin and the rinse solutions being water.

EXAMPLES

The following examples illustrate the invention non-limitingly.

Example 1

Ionic Metal Derivative

The process according to the invention is applicable to all types of metal derivatives, like for example a uranium salt such as uranyl sulfate, nickel, cobalt or copper with the help of a cationic resin, eluted by an acid, for example sulfuric acid. The invention therefore provides a process for separating an ionic metal derivative from a leaching solution containing such a derivative and impurities, by passing this solution over a fixed bed of ion exchanging resin and comprising at least four zones in series, liquid flow means being arranged between adjacent zones and between the last and the first zones, said metal salt being selectively exchanged by contact with said ion exchanging resin and at least one of the impurities being relatively less exchanged on this ion exchanging resin than the metal salt, ion exchanging resin whereof the exchange power is regenerated through the action of a regenerant, characterized in that it comprises several sequences, each sequence comprising the following steps:

(a) introducing a certain volume of water at the inlet of the first zone and substantially simultaneously withdrawing the same volume of a liquid diluted in said metal salt, at least at a point situated downstream from that zone;

(b) introducing a certain volume of said aqueous solution at the inlet of the second zone and substantially simultaneously withdrawing the same volume of a liquid rich in the relatively less exchanged impurity(ies), at a point situated downstream from said zone;

(c) introducing a certain volume of water at the inlet of the third zone and substantially simultaneously withdrawing the same volume of a liquid diluted in eluent, at a point situated downstream from said zone;

(d) introducing a certain volume of eluent at the inlet of the fourth zone and substantially simultaneously withdrawing the same volume of a liquid rich in the metal salt, at a point situated downstream from said zone;

steps (a), (b), (c) and (d) being able to be carried out simultaneously or not;

each following sequence being done by the periodic displacement downstream, substantially by a same volume increment, of the introduction and withdrawal points, and also comprising a step (e) displacement of the fronts in the zones before the periodic displacement.

In the case of uranyl sulfate, the eluent is an acid solution. If one compares the process according to the invention to a continuous process of the state of the art for a given production of uranyl salt, the process allows significant gains. For an identical production, the consumables are greatly reduced, water consumption is decreased, effluent production is reduced, and the number of columns is also reduced.

Example 2

Ionic Metal Derivative, Uranyl Sulfate

To implement the separation of uranium, the following process is carried out.

The feed fluid (leaching solution containing uranium and its impurities) contains the feed to be processed. The composition of this fluid allows the ionic metal derivative to attach on the stationary phase. At the end of the feed step, the column contains a stationary phase on which the uranyl sulfate is fixed by ionic force.

The rinse step thus renews the liquid phase of the column so that the impurities contained in the liquid phase of the column are not eluted at the same time as the metal salt during the elution step.

The elution fluid of the uranyl sulfate is 2M sulfuric acid. Indeed, it is proven to be a sufficiently energetic eluent of uranium IV, due to the very great stability of the uranyl-sulfate anionic complexes.

Figure 13:
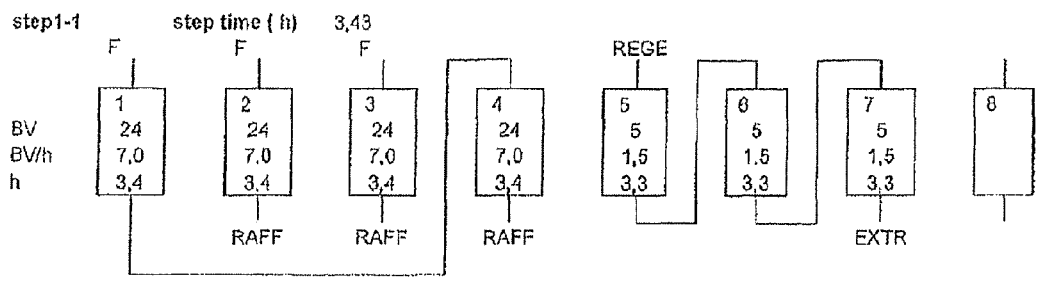
FIG. 13 illustrates a process according to the invention.
The following symbols are used in these figures:
W water
FD diluted ionic metal derivative
F leaching solution containing the ionic metal derivative (load solution or "feed" containing the desired metal species)
RAF raffinate
RD diluted regeneration solution
R regenerant
EXT extract
displ displacement of species
Ads adsorption
Pre ads preadsorption
Water displ. water displacement (rinsing)
Water water
$H_2SO_4$ displ. water displacement (regeneration)
Spare spare
Wash wash
Rege regeneration
Wash neutral wash neutral
Acidified water acidified water
Waste effluent
Step time duration of the sequence
Step sequence
Figure 13:
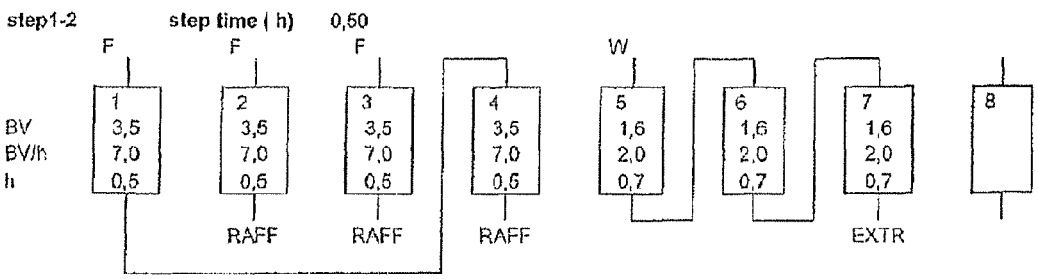
Figure 13:
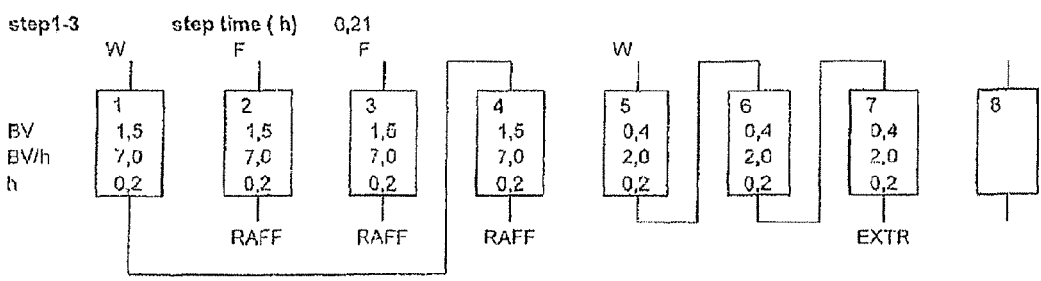

The test presented according to the sequenced multi-column separation process in this example uses 8 columns, according to the following sequences and subsequences, as illustrated in FIG. 13. For each of the numbered columns of the sequence, the bed volumes (BV) and durations are given.

Sequence 1

Subsequence 1.1: the first 4 columns define a feed zone. Column 5 is in regeneration zone. Columns 1 and 4 as well as 5 and 7 are in series. Column 8 is in pollution control or spare.

Subsequence 1.2: In this subsequence, column 5 is practically completely regenerated, and no longer contains uranyl sulfate, it then enters the rinse zone.

Subsequence 1.3: In this subsequence, column 1 is practically saturated with leaching solution containing the uranium to be extracted, it then goes into rinse.

Sequence 2

It is identical to sequence 1, but shifted by one column.

In the described system, a test is conducted at the feed speed of 413 m3/h, the leaching solution contains uranium at 0.35 g/L as well as impurities characteristic of a feed coming from an extraction process through leaching. The process parameters used for the separation of this solution are listed below.

Average flow: 413 m3/h
Subsequence 1 time: 3.43 h.
Subsequence 2 time: 0.50 h.
Subsequence 3 time: 0.21 h.
Step time: 4.14 h
Resin capacity: 29.9 g/L.

The invention claimed is:

1. A multi-column sequenced separation process on resin, the process comprising separating an ionic metal derivative from a leaching solution containing an ionic metal derivative, by passing said solution on a fixed resin bed and comprising at least three zones, liquid operably flowing between adjacent zones and between a last and a first zone, said process further comprising several sequences, each sequence comprising at least one step chosen from an adsorption step, a rinsing step, a desorption step, implemented simultaneously or not, each following sequence being done by the displacement of the fronts in said zones in a downstream direction by substantially a same increment before a periodic displacement of introduction and withdrawal points.

2. The process according to claim 1, further comprising several sequences, each sequence comprising at least one of the following steps:

(a) introducing a certain volume of a rinsing solution at an inlet of said first zone and substantially simultaneously withdrawing the same volume of a diluted liquid in said ionic metal derivative, at a point situated downstream from said zone;

(b) introducing a certain volume of said load leaching solution at an inlet of a second of said zones and substantially simultaneously withdrawing the same volume of a liquid rich in the relatively less retained impurity (ies), at a point situated downstream from said zone;

(c) introducing a certain volume of a rinsing solution at an inlet of a third of said zones and substantially simultaneously withdrawing the same volume of a liquid diluted in regenerant, at a point situated downstream from said zone;

(d) optionally introducing a certain volume of depolluting agent at an inlet of a fourth of said zones and substantially simultaneously withdrawing the same volume of a diluted liquid, at a point situated downstream from said zone;

(e) introducing a certain volume of an eluent at an inlet of a fifth of said zones and substantially simultaneously withdrawing the same volume of a liquid rich in said metal derivative, at a point situated downstream from said zone;

steps (a), (b), (c), (d) and (e) being able to be done simultaneously or not;

each subsequent sequence being done through the periodic downstream movement, by substantially a same volume increment, of said introduction and withdrawal points;

and also including a step:

(f) displacement of the fronts in at least zones (b) and (e) before the periodic displacement.

3. The process according to claim 1, wherein steps (d) and (e) are done with a same fluid, these steps corresponding then to a step comprising:

(d) introducing a certain volume of regenerant at said inlet of said fourth zone and substantially simultaneously withdrawing the same volume of a liquid rich in said ionic metal derivative, at a point situated downstream from said zone;

said fourth and fifth zones then being combined into a single fourth zone.

4. The process according to claim 1, wherein steps (a), (b), (c) and (d) are done at least partially simultaneously.

5. The process according to claim 1, wherein said displacement of the fronts displaces the fronts synchronously in the different zones.

6. The process according to claim 5, wherein the displacement of the fronts comprises the following steps:
(i) creating a circulation loop zone between the different zones, from said first zone to a fifth of said zones; and
(ii) putting in circulation in said loop to displace the fronts.

7. The process according to claim 5, wherein the displacement of the fronts comprises the following steps:
(i) creating a first displacement zone through fluid connection of an outlet of said first zone to an inlet of a second of said zones and through fluid connection of an outlet of a second of said zones to an inlet of a third of said zones, and downstream displacement of an inlet of said first zone to provide an inlet of the first displacement zone and upstream displacement of an outlet of said third zone to provide said outlet of said first displacement zone; and
creating a second displacement zone through fluid connection of the outlet of said third zone to an inlet of a fourth of said zones and through fluid connection of an outlet of said fourth zone to an inlet of a fifth of said zones and fluid connection of an outlet of said fifth zone to said inlet of said first zone, and downstream displacement of said inlet of said third to provide an inlet of a second displacement zone and upstream displacement of said outlet of said first zone to provide said outlet of said second displacement zone; and
(ii) introducing a certain volume of rinsing solution at the inlet of said first displacement zone and substantially simultaneously withdrawing the same volume of recovered rinsing solution at said outlet of said first displacement zone;
(iii) introducing a certain volume of rinsing solution at said inlet of said second displacement zone and substantially simultaneously withdrawing the same volume of recovered rinsing solution at said outlet of said second displacement zone.

8. The process according to claim 1, wherein said displacement of the fronts displaces the fronts asynchronously in the different zones.

9. The process according to claim 8, wherein the displacement of the fronts comprises the following steps:
(i) creating a first zone of a first displacement through fluid connection of an outlet of said first zone to an inlet of a second zone and through fluid connection of an outlet of said second zone to an inlet of a third zone;
creating a second zone of a first displacement through fluid connection of an outlet of said third zone to an inlet of a fourth zone and through fluid connection of said outlet of said fourth zone to an inlet of a fifth zone and fluid connection of an outlet of said fifth zone to an inlet of the first zone;
(ii) introducing a certain volume of said solution at said inlet of said first displacement zone and substantially simultaneously withdrawing the same volume of a diluted regenerant liquid at said outlet of said first zone of a first displacement;
(iii) introducing a certain volume of regenerant at said inlet of the second displacement zone and substantially simultaneously withdrawing the same volume of a liquid diluted in said ionic metal derivative at said outlet of said second zone of a first displacement;
(iv) creating a first zone of a second displacement through fluid connection of said outlet of said first zone to said inlet of said second zone and through fluid connection of said outlet of the second zone to said inlet of said third zone, and downstream displacement of said inlet of said first zone to provide said inlet of said first zone of a second displacement and upstream displacement of said outlet of said third zone to provide the outlet of said first zone of a second displacement;
(v) creating a second zone of a second displacement through fluid connection of said outlet of said third zone to said inlet of said fourth zone and through fluid connection of said outlet of said fourth zone to said inlet of said fifth zone and fluid connection of said outlet of said fifth zone to said inlet of said first zone, and downstream displacement of said inlet of said third zone to provide said inlet of said second displacement zone and upstream displacement of the outlet of said first zone to provide said outlet of said second displacement zone; and
(vi) introducing a certain volume of rinsing solution at said inlet of said first zone of a second displacement and substantially simultaneously withdrawing the same volume of a liquid rich in the relatively less retained impurity(ies) or impurities at said outlet of said first zone of a second movement; and
(vii) introducing a certain volume of rinsing solution at said inlet of said second zone of a second displacement and substantially simultaneously withdrawing the same volume of a liquid rich in said ionic metal derivative at the outlet of said second zone of a second displacement.

10. The process according to claim 1, wherein step (f) comprises a movement of the fronts in all of the zones before the periodic displacement.

11. The process according to claim 1, wherein the volume increment according to which said introduction points and said withdrawal points are displaced corresponds substantially to the volume of an entire fraction of a zone of absorbent material.

12. The process according to claim 1, wherein said liquid diluted in said ionic metal derivative is at least in part sent to step (b).

13. The process according to claim 1, further comprising an additional zone, and a step (g) introducing all or part of the liquid diluted in said ionic metal derivative obtained in step (a) at said additional zone, and recovering substantially the same volume in rinsing solution at a point situated downstream from said zone.

14. The process according to claim 1, further comprising using chromatography of an ion exchange type, and selecting the ionic metal derivative as a salt selected from the complexes of uranium, gold, copper, zinc, nickel, cobalt, as well as PGM.

15. The process according to claim 1, wherein the eluent is sulfuric acid.

* * * * *